(12) United States Patent  (10) Patent No.: US 7,059,259 B2
Allen  (45) Date of Patent: Jun. 13, 2006

(54) WING IN GROUND EFFECT VEHICLE WITH ENDPLATES

(75) Inventor: Ken R. Allen, London (GB)

(73) Assignee: Wingship Limited, Rarotonga (CK)

( * ) Notice: Subject to any disclaimer, the term of this patent is extended or adjusted under 35 U.S.C. 154(b) by 218 days.

(21) Appl. No.: 10/275,943

(22) PCT Filed: May 17, 2001

(86) PCT No.: PCT/AU01/00564

§ 371 (c)(1),
(2), (4) Date: Jul. 23, 2003

(87) PCT Pub. No.: WO01/87682

PCT Pub. Date: Nov. 22, 2001

(65) Prior Publication Data

US 2004/0065246 A1    Apr. 8, 2004

Related U.S. Application Data

(63) Continuation-in-part of application No. 09/573,385, filed on May 18, 2000, now abandoned.

(51) Int. Cl.
  *B63B 1/34* (2006.01)
(52) U.S. Cl. ..................... 114/67 A; 180/116
(58) Field of Classification Search ........ 114/274–282, 114/272, 273, 67 A, 67 R; 180/116–120
See application file for complete search history.

(56) References Cited

U.S. PATENT DOCUMENTS

| | | | |
|---|---|---|---|
| 2,348,106 A | 5/1944 | Brian et al. | |
| 3,016,865 A | 1/1962 | Eichenberger | |
| 3,041,992 A | 7/1962 | Lee | |
| 3,075,489 A | 1/1963 | Eichenberger | |
| 3,109,495 A | 11/1963 | Lang | |
| 3,705,846 A | 12/1972 | Kato et al. | |
| 3,768,429 A | 10/1973 | Greer | |
| 3,968,762 A | 7/1976 | Meyer, Jr. | |
| 4,068,606 A | 1/1978 | Van Veldhuizen | |
| 4,442,986 A * | 4/1984 | Rousseau | 244/12.1 |
| 4,883,015 A | 11/1989 | Jorg | |
| 4,926,773 A | 5/1990 | Manor | |
| 5,622,133 A | 4/1997 | Sinitsyn et al. | |
| 5,738,331 A | 4/1998 | Woolley | |
| 6,167,829 B1 | 1/2001 | Lang | |
| 6,230,835 B1 * | 5/2001 | Fischer et al. | 180/117 |

(Continued)

FOREIGN PATENT DOCUMENTS

DE    1 146 774    4/1963

(Continued)

OTHER PUBLICATIONS

Sarley & Johnson, "The Design of Two Dimensional Low Drag, Base-Vented Struts," Hydronautics Technical Report 001-11, (Mar. 11, 1962).

Lockheed-California Company, "Wind-Tunnel Investigation of Single and Tandem Low-Aspect Radio Wings in Ground Effect," Lockheed Report 16906, TRECOM Technical Report 63063, (Mar. 11, 1964).

(Continued)

*Primary Examiner*—Ed Swinehart
(74) *Attorney, Agent, or Firm*—Jones, Tullar & Cooper, PC

(57) ABSTRACT

A Wing In Ground Effect Vehicle has a pair of supercavitating endplates (17) which extend below the fuselage (2) such that they can be immersed in water during flight thereover. The endplates have a nose (28) defining a leading edge (20) and adapted to generate a supercavity. The endplates (17) typically pivot about a pivot axis P to provide a stabilising weathercock-type effect.

48 Claims, 19 Drawing Sheets

U.S. PATENT DOCUMENTS 6,439,148 B1 * 8/2002 Lang .......................... 114/278

FOREIGN PATENT DOCUMENTS

DE            25 43 737 A     4/1977
DE            29 42 882 A1    5/1981

OTHER PUBLICATIONS

Barkley, W.B., "Force and Spray Characteristics of Wing Ead Plates Penetrating the Water Surface," General Dynamics Convair Report GD/C-64-100, 1st ed., (Apr. 11, 1964).

Ashill, P. R., "On the Minimum Induced Drag of Ground-Effect Wings," The Aeronatical Quarterly, Royal Aeronautical Society (London, UK), (Aug. 11, 1970).

Moore, J. W. et al., "Parametric and Conceptual Design Study of Aircraft Wing-in-Ground Effect (WIG) Vehicles," Report No. 76020-30 and LG77ER0049, Lockheed-Georgia Company, (May 11, 1977).

Moore, J. W., "Conceptual Design Sutdy of Power Augmented Ram Wing-In Ground Effect Aircraft," AIAA Paper No. 78-1466, (Aug. 11, 1978).

Lange, R.H. and Moore, J. W., "Large Wing-In-Ground Effect Transport Aircraft," AIAA Paper No. 79-0845, (Nov. 11, 1979).

Mantle, Peter J., "Air Cushion Craft Development (First Revision)," DTNSRDC Report 80/012 (2727 Revised), (Jan. 11, 1980).

* cited by examiner

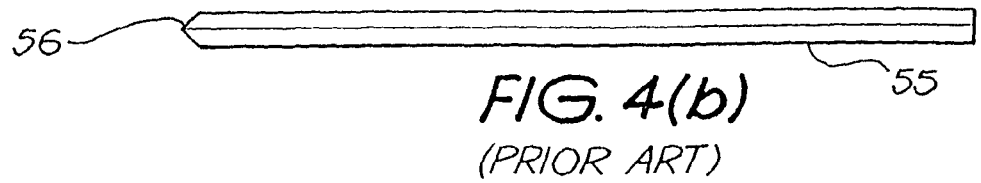
FIG. 4(b)
(PRIOR ART)
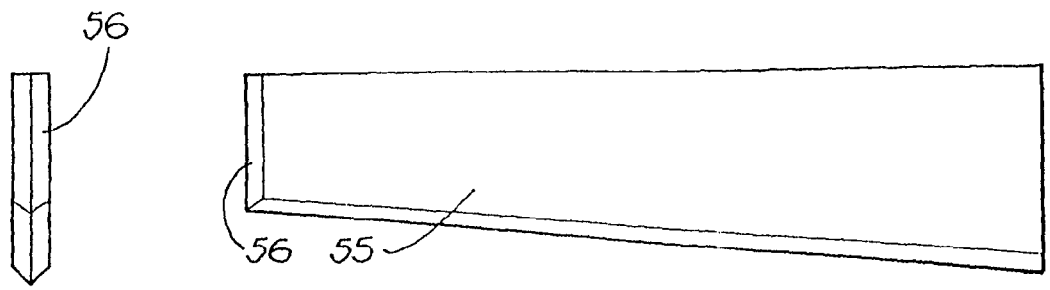
FIG. 4(a)
(PRIOR ART)
FIG. 4(c)
(PRIOR ART)
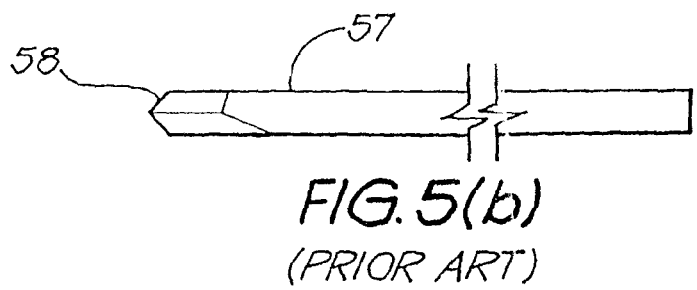
FIG. 5(b)
(PRIOR ART)
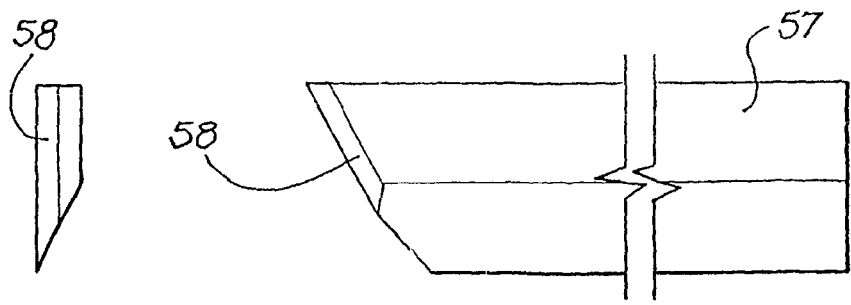
FIG. 5(a)
(PRIOR ART)
FIG. 5(c)
(PRIOR ART)

END PLATE DRAG

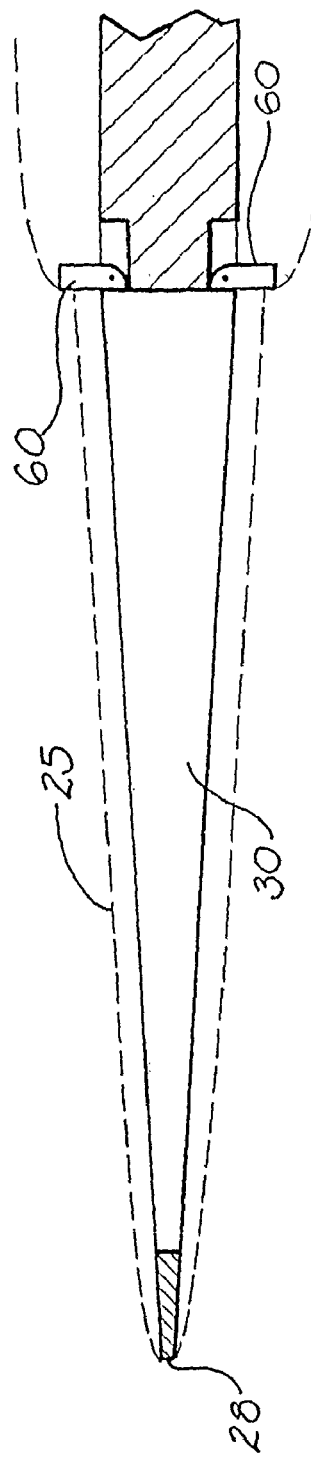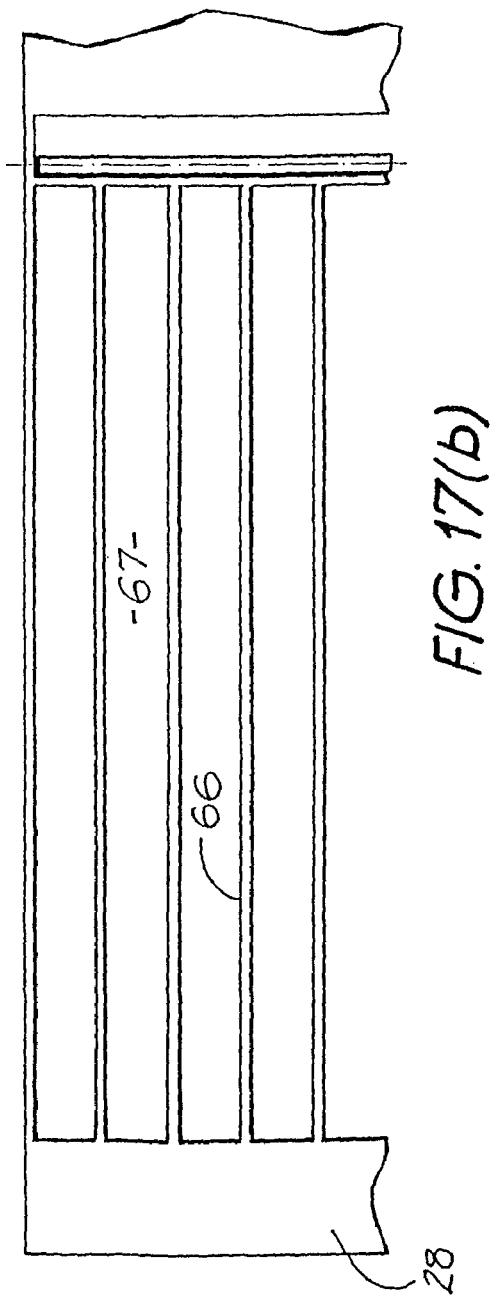
FIG. 17(a)
FIG. 17(b)

WING IN GROUND EFFECT VEHICLE WITH ENDPLATES

This application is a continuation-in-part of application Ser. No. 09/573,385, filed May 18, 2000 now abandoned.

FIELD OF THE INVENTION

The present invention relates to Wing In Ground Effect Vehicles (WIGs) and more particularly to WIGs with endplates that operate over water.

BACKGROUND OF THE INVENTION

A significant part of the drag of transport aircraft is made up of induced drag. Flying in ground effect close to the ground or water can reduce this drag. Numerous WIGs have been developed and flown.

Several large WIG designs have been proposed but never built. These are summarised in two reports, "Air Cushion Craft Development (First Revision)" (DTNSRDC Report 80/012 (4727 revised) January 1980) by Peter J. Mantle (hereinafter referred to as the Mantle Report), and "Wingship Investigation" (Advanced Research Projects Agency, Sept. 30, 1994) (hereinafter referred to as the ARPA Report).

Because the height of land varies so much it is normal to fly WIGs over water. All existing WIGs fly entirely above the water at the height of the highest wave expected to be encountered plus a margin of safety. This is because of the extremely high wave impact forces that would be incurred at cruise speed. The ARPA Report concluded that designing basic structure and mission loads to tolerate impact with large waves is probably impracticable.

The ARPA Report also concludes that the induced drag increases and the Power Augmented Ram (PAR) lift decreases with the height of the endplates above the water. PAR directs the jet from engines located forward of the wing under the wing to provide added lift at slower speeds. Because of this there is an advantage for WIG endplates to penetrate the waves so that there is no gap at the wave trough between the bottom of the endplate and the water. The existing prior art has not taken advantage of the above as it has been assumed to be impossible to design wave piercing endplates that would (i) have a low enough drag in the water and (ii) be stable at expected angles of yaw at design cruise speed.

As a result, the endplates of existing WIGs usually resemble slender hull shapes similar to high speed racing catamarans, some of which include steps to reduce water friction on take-off. Because these designs are still relatively thick they would incur severe wave impact pressures at cruise speed as well as high drag. Consequently, these endplates are designed to be no lower than the lowest part of the fuselage of the WIG. As a result there is always an air gap greater than the wave height between the wing tip or endplate and the trough of each wave. This restricts their ability to reduce the induced drag. Typical lift/drag ratios of Russian craft are around 18:1 and the ARPA Report study was unable to significantly improve on this figure even for a very large craft of 5,000 tonnes (after making changes required to achieve the longer range set by the study). As these lift/drag ratios are no better than those achieved by aircraft it is understandable why WIGs have never been commercialised.

The WIG configuration that has reached the highest level of technical maturity is the Russian "ekranoplan." This is described further in the ARPA Report. A typical example of the "ekranoplan" configuration is embodied in the Russian Orlyonok, depicted in FIGS. 1(a) to 1(c). In this prior art WIG, turbofan engines 1 are located on either side of the fuselage 2. These engines 1 are used for underwing blowing PAR to increase the lift of the wing 3 during take-off and landing thereby reducing take-off and landing speeds. The turbo prop engine 4 provides efficient thrust for cruise. The horizontal stabiliser 5 controls the pitching moment. A hydro ski 6 (shown in its lowered position) can be lowered to reduce hull impact pressures on landing. The endplates 7 help contain the pressure under the wing 3 to provide increased PAR lift during take-off and landing. Because the endplates 7 do not extend below the lowest part of the fuselage 2 the effective air gap 8 between the endplates 7 and the water 9 is no less than the gap 10 between the lowest part of the fuselage 2 and the water 9. The ability of the endplates 7 to reduce the induced drag is therefore limited.

FIGS. 2(a) and 2(b) illustrates the side and plan views of the thick prior art endplates 7 of the Orlyonok WIG. On take-off and landing these endplates 7 are designed to plane on the water surface 9 while the fuselage 2 is still supported by the water 9. Steps 12 in the bottom surface of the endplates help this planing action. The sides 13 are contoured to reduce air drag.

The U.S. Navy used thinner endplates with their PAR WIG model experiments disclosed at page 411 of the Mantle Report. These endplates were designed to pierce the waves but were unstable at cruise speed with a moderate angle of yaw. Even if these endplates did not fail, their relatively thick leading edge and forebody would make the drag of these endplates intolerably high when piercing waves at high speed.

In a report entitled "Force and Spray Characteristics of Wing Endplates Penetrating the Water Surface" (General Dynamics/Convair Report GD/C-64-100, April 1964) by W H Barkley (hereinafter referred to as the Barkley Report), four thin endplates with various nose shapes and side configurations are disclosed. Models of these configurations were tested in a towing tank and lift, drag and side forces were measured. When these endplate designs are scaled up to full-scale sizes, the drag forces on the Barkley design are prohibitively high. The raked bottom of three of the Barkley Report designs tested would allow a large air gap and thus cause an increase in induced drag.

FIGS. 3(a), 3(b) and 3(c) provide side elevation, plan and enlarged fragmentary plan views of the thin prior art endplates 14 as disclosed in the Barkley Report and similar to that used on the model in the US Navy experiments referred to in the Mantle Report. As shown in FIG. 3(c) these thin prior art endplates 14 had rounded noses 15 and parallel sides 16. The Mantle report, page 414, concluded that this type of parallel sided, round nosed endplate 14 would fail structurally at cruise speeds.

FIGS. 4(a) to 4(c) depict front, plan and side views of General Dynamics/Convair's test model No. 4 described in the Barkley Report. These endplates 55 have the advantage of a small amount of side force when exposed to moderate amounts of yaw alone (Run No. 5). They do however experience high side forces when certain angles of yaw and roll are combined (Run No. 6). These endplates 55 therefore need to be quite thick to resist the side force resulting in a high drag.

The endplate model No. 4 tested in the Barkley Report had the following dimensions: thickness—1" (25 mm), working depth—4" (100 mm), chord length—2' (610 mm). Scaled up to a depth of 144" (3.7 m) the dimensions would be: thickness-36" (914 mm), depth—144" (3.7 m) and chord length—72' (22 m). The strength of such an endplate would likely be sufficient but the large thickness would provide excessive drag.

In papers by J. W. Moore, including "Conceptual Design Study of Power Augmented Ram Wing-In-Ground Effect Aircraft" (AIAA Paper 78-1466, Los Angeles, Calif., August, 1978) (herein after referred to as the Moore Report), endplates as depicted in FIGS. 5(a) to 5(c) and based on model No. 4 of the Barkley Report were proposed. Because of their high drag, these endplates 57 were designed to operate above the water most of the time except for impact with every 1/1000 wave crest to a depth of 0.63' (192 mm) and 1.4' (427 mm) for sea states 3 and 4 respectively. The drag force of each endplate 57 was calculated as 687,000 lbs (3.06 MN) and 1,148,000 lbs (5.11 MN) at an immersion depth of 1.4' (427 mm) and yaw angles of 0 degrees and 10 degrees respectively. For the two endplates 57 the total drag would be 1,374,000 lbs (6.112 MN) at 0 yaw and 2,296,000-lbs (10.21 MN) at 10 degrees yaw, equivalent to 88% and 147% of the gross weight of the entire WIG (for an immersion depth of only 1.4' (427 mm)). This extremely high drag is caused by the thick wedge nose 58 chosen "to assure non-attached flow along the endplate length" when impacting every 1/1000 wave crest. The endplates 57 are not designed for and would be completely impracticable for continuous immersion to the depth of the wave trough, as the drag would be sufficient to down the WIG. In addition Moore concluded that the high side force in yaw would create structural failure of the endplate 57 at an immersion depth of 4.3' (1300 mm) and a speed of 265 knots (136 m/s) in a sea state 4.

The prior art endplates discussed above generally have very high drag characteristics and lack of stability if immersed in water.

In two further reports, "On the Minimum Induced Drag of Ground Effect Wings," (The Aeronautical Quarterly, Royal Aeronautical Society, London, UK, August 1970) by P. R. Ashill (hereinafter referred to as the Ashill Report) and "Wind-Tunnel Investigation of Single and Tandem Low-Aspect-Ratio Wings In Ground Effect" (Lockheed Calif., March 1964) (hereinafter referred to as the Lockheed Report), it was shown that the addition of vertical plates at each end of the wing can be used to reduce or eliminate the induced drag.

Ashill concludes that the induced drag→0 as l/b→h/b (where l=distance from the bottom edge of the wing at the ¼ chord point to the bottom of the endplate, h=distance between from the bottom edge of the wing at the ¼ chord point to the ground and b=span of wing). This is confirmed by the following extrapolation of the results found in FIGS. 17 and 18 of the Lockheed Report, reproduced here as Tables 1 and 2 wherein:

$C_l$=lift coefficient, L/D=lift/drag ratio, AR=aspect ratio of the wing, h=distance between bottom of the endplate and the ground; S=area of the wing and O.G.E.=2-dimensional test Out Of Ground Effect.

TABLE 1

Flat Endplates, AR = 4, Endplate depth = 0.15 chord

| $C_l$/(L/D) | h/√S | Total Drag | Induced Drag | Induced Drag/ √(h/√S) |
|---|---|---|---|---|
| 0.5/50 | O.G.E. | 0.01 | 0.0 | — |
| 0.5/38 | 0.01 | 0.01316 | 0.00316 | 0.0316 |
| 0.5/35 | 0.02 | 0.01429 | 0.00429 | 0.0303 |
| 0.5/30 | 0.04 | 0.01667 | 0.00667 | 0.0333 |

TABLE 2

Contoured Endplates, AR = 4, Endplate depth = 0.015 chord

| $C_l$/(L/D) | h/√S | Total Drag | Induced Drag | Induced Drag/ √(h/√S) |
|---|---|---|---|---|
| 0.5/56 | O.G.E. | 0.00893 | 0.0 | — |
| 0.5/40 | 0.01 | 0.0125 | 0.00357 | 0.0357 |
| 0.5/36 | 0.02 | 0.0139 | 0.00497 | 0.0355 |
| 0.5/31 | 0.04 | 0.016 | 0.007 | 0.035 |

These figures show that, for small values of h/√S, the induced drag/(h/√S)≈constant. Thus the Induced Drag approaches zero as h approaches zero.

The application of this concept can effectively raise the elevation of the basic structure so as to avoid its impact with waves. Thus if endplates could be designed with adequate structural strength and low enough drag to operate immersed in the water, a WIG with attractive performance could be achieved.

OBJECT OF THE INVENTION

It is an object of the invention to provide an improved wing in ground effect vehicle with endplates capable of operating immersed in water.

SUMMARY OF THE INVENTION

In a broad form the present invention provides a wing in ground effect vehicle having a fuselage and wing structure with opposing wing tip portions and a pair of supercavitating endplates each extending downwardly from a respective said wing tip portion to below said fuselage and wing structure for immersion in water during flight thereover, each said endplate having:

a proximal root, a distal tip, a forward portion including a nose defining a leading edge of said endplate and terminating in a nose lateral edge on each lateral side of said endplate, said nose being adapted to generate a cavity extending rearwardly from each said nose lateral edge between the respective said lateral side of said endplate and water passing over said endplate, in use, at a zero yaw condition at speeds up to and including a design cruise speed with said endplate immersed in water to a design immersion depth, said cavities forming a supercavity at said design cruise speed, and an aft portion terminating in a trailing edge, wherein at least part of said forward portion of each said endplate is laterally fixed with respect to the respective said wing tip portion and said trailing edge of each said endplate is laterally displaceable, with respect to the respective said wing tip portion, by water flowing over said endplate in use.

In another broad form the present invention provides a wing in ground effect vehicle having a fuselage and wing structure with opposing wing tip portions and a pair of supercavitating endplates each extending downwardly from a respective said wing tip portion to below said fuselage and wing structure for immersion in water during flight thereover, each said endplate having:

a proximal root, a distal tip, a forward portion including a nose defining a leading edge of said endplate and terminating in a nose lateral edge on each lateral side of said endplate, said nose being adapted to generate a cavity extending rearwardly from each said nose lateral edge between the respective said lateral side of said endplate and water passing over said endplate, in use, at a zero yaw condition at speeds up to and including a design cruise speed with said endplate immersed in water to a design immersion depth, said cavities forming a supercavity at said design cruise speed, and an aft portion terminating in a trailing edge, wherein said nose of each said endplate is substantially flat and lies in a plane substantially perpendicular to the chord-wise direction of said endplate.

Preferably, each said endplate is pivotably mounted about a pivot axis extending in a span-wise direction of said endplate, said forward portion of each said end plate being laterally fixed at said pivot axis.

The wing in ground effect vehicle may further comprise means for actively controlling rotation of said endplates about the respective said pivot axes.

In an alternate form, said forward portion of each said endplate is fixed and said aft portion of each said endplate is pivotally mounted about a pivot axis extending in a span-wise direction of said endplate.

Preferably, said pivot axis of each said endplate is located forward of the hydrodynamic centre of pressure of said endplate at said design cruise speed with said endplate immersed in water to said design immersion depth.

Preferably, said pivot axis of each said endplate is located less than 0.25 times the chord length of said endplate aft of said leading edge at a span-wise position midway between said endplate root and tip.

In another alternate form, said forward portion of each said endplate is fixed and said aft portion of each said endplate is laterally flexible and is mounted to the respective said forward portion.

Preferably, said aft portion of each said endplate extends forward of the hydrodynamic centre of pressure of said endplate at said design cruise speed with said endplate immersed in water to said design immersion depth.

Preferably, said aft portion of each said endplate has a chord length of at least 0.75 times the chord length of said endplate at a span-wise position midway between said endplate root and tip.

In another broad form the present invention provides a wing in ground effect vehicle having a fuselage and wing structure with opposing wing tip portions and a pair of supercavitating endplates each extending downwardly from a respective said wing tip portion to below said fuselage and wing structure for immersion in water during flight thereover each said endplate having:

a proximal root, a distal tip, a forward portion including a nose defining a leading edge and adapted to generate a supercavity between each lateral side of said endplate and water passing over said endplate, in use, at a zero yaw condition at a design cruise speed with said endplate immersed in water to a design immersion depth, an aft portion terminating in a trailing edge, and a protrusion on each opposing side of said front portion, at a lower region thereof and aft of said nose, for engaging water passing outside of said supercavity, on the upstream side of said endplate when said endplate is yawed with respect to said water passing over said endplate and/or on both sides of said endplate when said endplate is immersed beyond said design immersion depth, each said protrusion extending in a span-wise direction and having a face configured to create a stabilising moment upon engaging said water, said lower region having a length in said span-wise direction at least equal to said design immersion depth of said endplate.

In yet another broad form the present invention provides a wing in ground effect vehicle having a wing structure with opposing wing tip portions and a pair of supercavitating endplates each extending downwardly from a respective said wing tip portion to below said fuselage and wing structure for immersion in water during flight thereover, each said endplate having:

a proximal root, a distal tip, a forward portion including a nose defining a leading edge and adapted to generate a supercavity between each lateral side of said endplate and water passing over said endplate, in use, at a zero yaw condition at a design cruise speed with said endplate immersed in water to a design immersion depth, and an aft portion terminating in a trailing edge, wherein, over the lowermost 1200 mm of said nose, said nose has an average width not greater than 0.006 times said chord length and an average depth, measured in a chordwise direction, of not greater than 0.83 times said nose average width.

The nose of each said endplate may be in the general form of a triangular prism extending in a spanwise direction.

Preferably, said forward portion of each said endplate tapers towards said nose.

In the preferred embodiment, said nose of each said endplate is substantially flat and lies in a plane substantially perpendicular to the chord-wise direction of said endplate.

Preferably, the width of said nose of each said endplate satisfies the following equation:

$$\frac{gHL}{8.8V^2} \le h \le 10\left(\frac{gHL}{8.8V^2}\right)$$

wherein h=nose width, g=acceleration due to gravity, H=design immersion depth of said endplate, L=chord length of endplate, V=vehicle design speed.

Preferably, each said supercavity has a length less than 5 times said chord length at substantially all span-wise locations within 50% of said design immersion depth from said endplate tip.

Preferably, over the lowermost 1200 mm of said nose, said nose has an average width not greater than 0.006 times said chord length and an average depth, measured in a chordwise direction, of not greater than 0.83 times said nose average width.

Each said endplate may be provided with a protrusion on each opposing side of said front portion, at a lower region thereof and aft of said nose, for engaging water passing outside of said supercavity on the upstream side of said endplate when said endplate is yawed with respect to said water passing over said endplate and/or on both sides of said endplate when said endplate is immersed beyond said design immersion depth, each said protrusion extending in a span-wise direction and having a face configured to create a stabilising moment upon engaging said water, said lower region having a length in said span-wise direction at least equal to said design immersion depth of said endplate.

Each said protrusion may be in the form of a flap means configurable between a retracted position within said endplate and an extended position protruding beyond said endplate for engaging said water passing outside of said cavity.

Alternatively, each said protrusion is fixed.

Preferably, each of said protrusions has a concave front surface facing said leading edge.

Each said endplate may be provided with a retractable leading edge device of greater width than said nose, said leading edge device being extendable along and over said leading edge.

Preferably, said leading edge device of each said endplate has a substantially flat front surface lying in a plane substantially perpendicular to said chord-wise direction of said endplate.

Preferably, each said endplate is curved inwards towards the centre of said vehicle at said tip.

Preferably, each said endplate is tapered in thickness from said root to said tip.

Preferably, said trailing edge of each said endplate is tapered.

Each said endplate may be provided with a plurality of wedge-shaped members secured to a lower region of said aft portion thereof, said lower region having a length in said span-wise direction at least equal to a design immersion depth of said endplate.

Said distal tip of each said endplate may be lower at said trailing edge than at said leading edge when viewed in a chord-wise direction.

Each said endplate forward portion may be provided with a pair of support struts on opposing sides of said endplate and each secured at a first end thereof to the respective said wing and at a second end thereof to said endplate toward said tip.

Preferably, each said support strut first end is displaceable with respect to the respective said wing towards the respective said endplate root.

Preferably, said forward portion of each said endplate is provided with apertures, forward of said protrusions, extending through the thickness thereof.

Said leading edge of each said endplate may be raked aft.

Said leading edge of each said endplate may be located forward of the leading edge of the respective said wing at said endplate root.

Each said endplate may be retractably mounted with respect to said wing tip portion to thereby enable raising of said endplate.

Preferably, each said endplate is mounted on the respective said wing tip portion by fastening means designed to detach at a predetermined load.

Each said endplate may be mounted on the respective said wing tip portion by explosive bolts.

Alternatively, a lower portion of each said endplate may be configured to detach from an upper portion of the respective said endplate upon impact of a predetermined load on said lower portion.

The fuselage and wing structure may form a flying wing structure.

Said root of each said endplate may be located outboard of and adjacent to the respective said wingtip portion with a gap therebetween, further wherein a seal spans said gap between said endplate root and said wingtip portion towards the upper surface of said wingtip portion.

BRIEF DESCRIPTION OF THE DRAWINGS

Preferred forms of the present invention will now be described by way of example with reference to the accompanying drawings, wherein:

FIG. 4(a) is a front elevation view of a prior art endplate according to Model No. 4 of the Barkley Report.

FIG. 4(b) is an inverse plan view of the endplate of FIG. 4(a).

FIG. 4(c) is a side elevation view of the endplate of FIG. 4(a).

FIG. 5(a) is a front elevation view of a prior art endplate according to the Moore Report.

FIG. 5(b) is an inverse plan view of the endplate of FIG. 5(a).

FIG. 5(c) is a side elevation view of the endplate of FIG. 5(a).

FIG. 17(a) is a fragmentary cross sectional plan view of an endplate with flaps.

FIG. 17(b) is a side elevation view of the endplate of FIG. 17(a).

DETAILED DESCRIPTION OF THE PREFERRED EMBODIMENTS

Figure 1A:
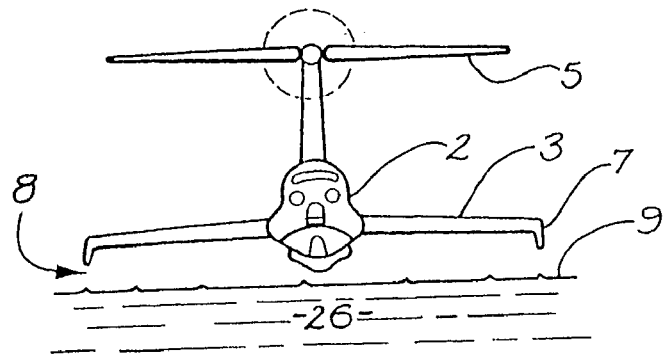
FIG. 1(a) is a front elevation view of a prior art Russian Orlyonok WIG.
Figure 1B:
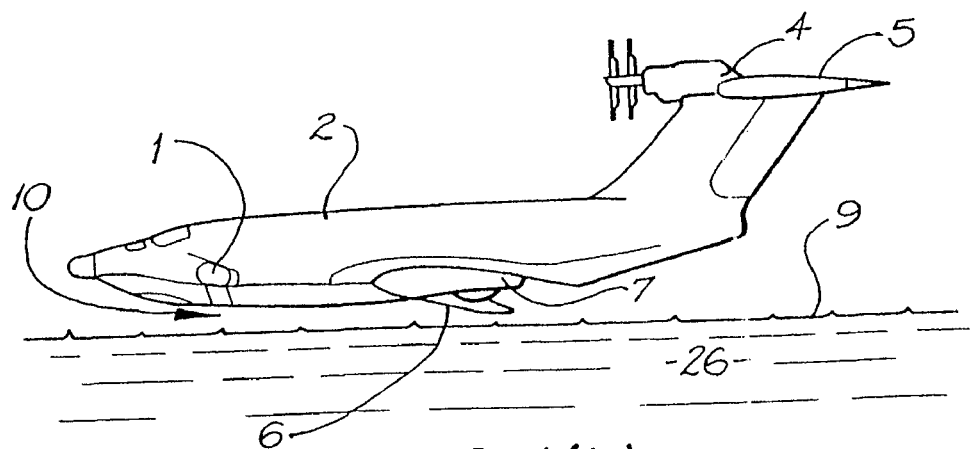
FIG. 1(b) is a side elevation view of the WIG of FIG. 1(a).
Figure 1C:
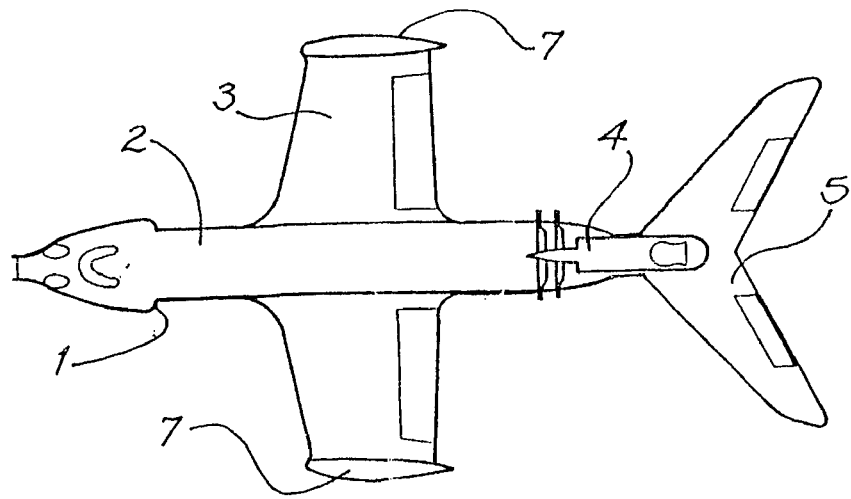
FIG. 1(c) is a plan view of the WIG of FIG. 1(a).
Figure 2A:
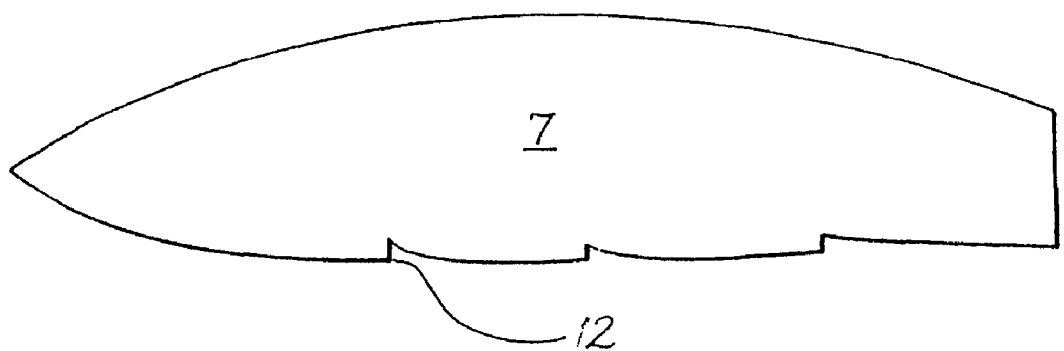
FIG. 2(a) is a side elevation view of an endplate of the WIG of FIG. 1(a).
Figure 2B:
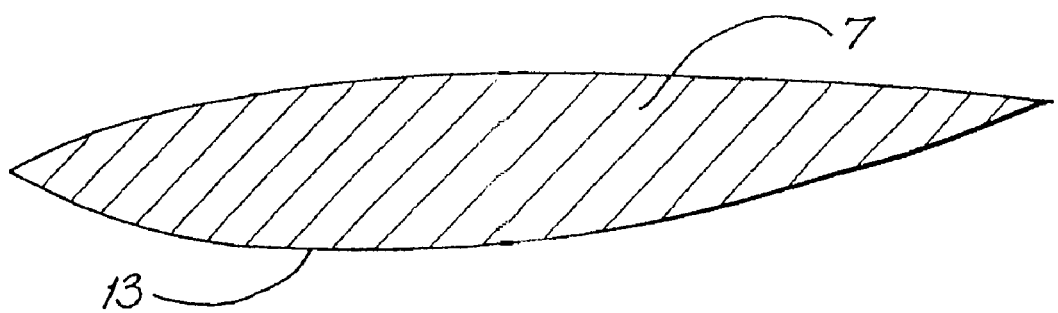
FIG. 2(b) is a cross sectional plan view of the endplate of FIG. 2(a).
Figure 3A:
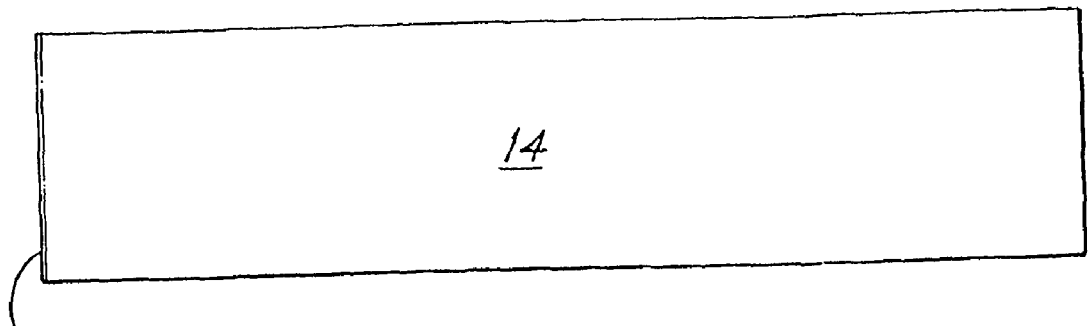
FIG. 3(a) is a side elevation view of a prior art endplate according to the Barkley Report.
Figure 3B:
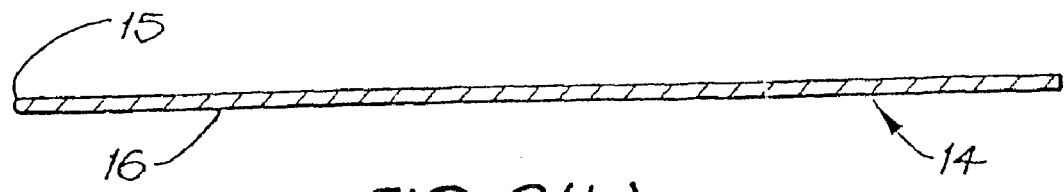
FIG. 3(b) is a cross sectional plan view of the endplate of FIG. 3(a).
Figure 3C:
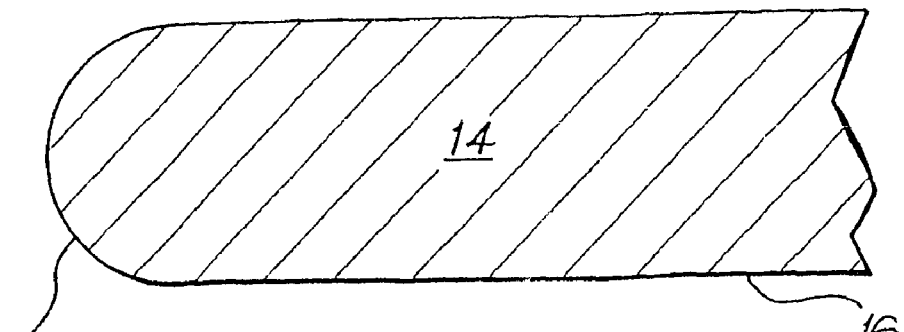
FIG. 3(c) is an enlarged fragmentary cross sectional plan view of the endplate of FIG. 3(a).
Figure 6A:
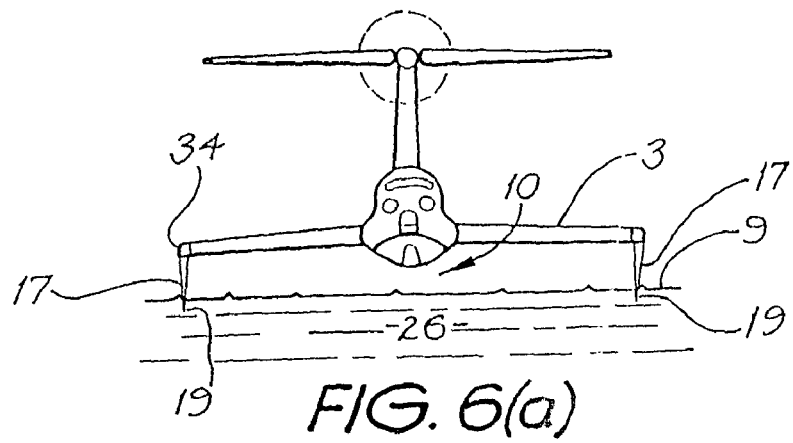
FIG. 6(a) is a front elevation view of a WIG according to a preferred embodiment of the present invention.
Figure 6B:
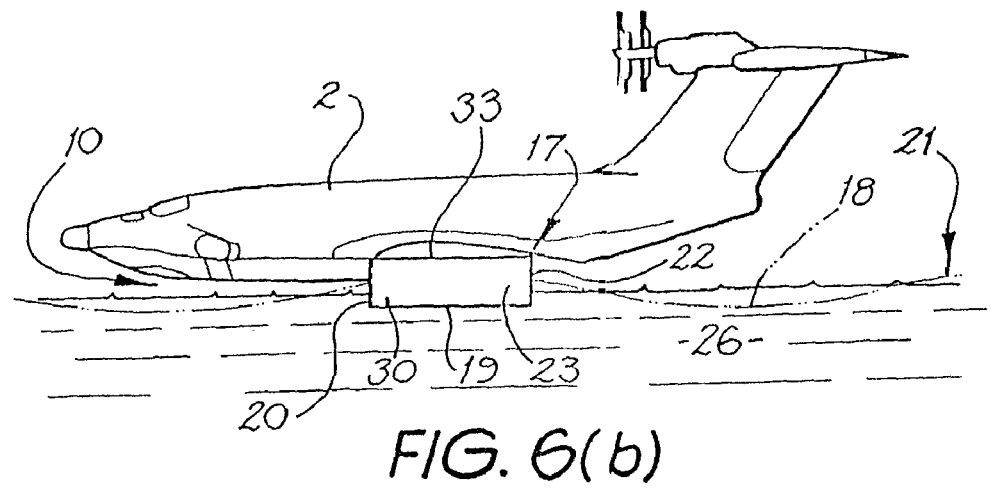
FIG. 6(b) is a side elevation view of the WIG of FIG. 6(a).
Figure 6C:
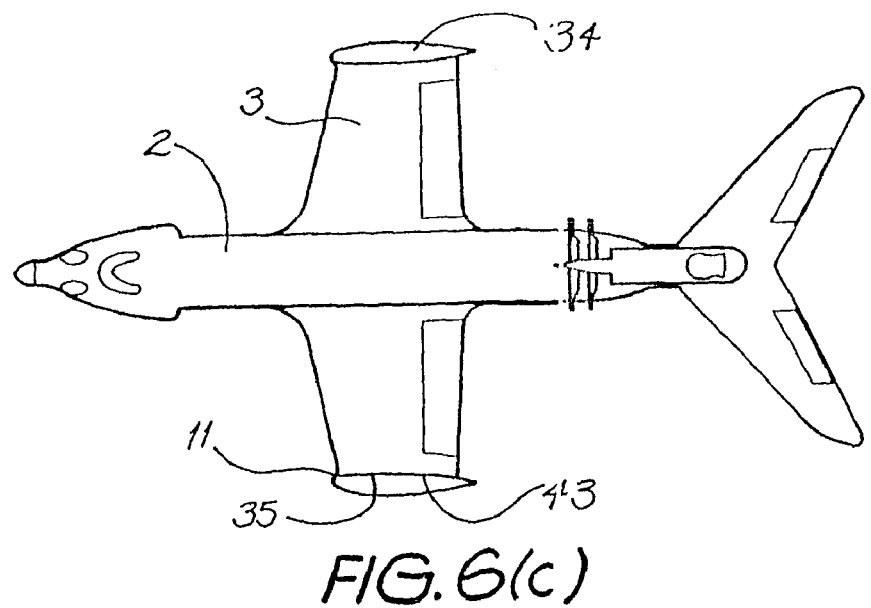
FIG. 6(c) is a plan view of the WIG of FIG. 6(a).

FIGS. 6(a) through 6(c) depict a wing in ground effect vehicle according to a preferred embodiment of the present invention. The wing in ground effect vehicle is provided with a fuselage 2 and wing structure 3 with opposing wing tip portions. A pair of endplates 17, each having a proximal root 33, bottom or distal tip 19, leading edge 20 and trailing edge 22, extend downwardly from endplate bulkheads 34 at the wingtip portions to below the fuselage 2 and wing structure 3. This enables the endplates 17 to be immersed in water 26 during flight thereover as depicted in FIG. 6(b) whilst keeping the fuselage 2 and wing structure 3 airborne. In flight, the endplates will typically be slightly submerged below the surface 9 of the water 26 even in the trough 18 of waves 21, depicted in phantom in FIG. 6(b). As there is no air gap between the distal tip 19 of the endplates 17 and the water 26 the induced drag of the WIG is reduced, thereby increasing the lift/drag ratio of the WIG. To maintain the endplates immersed in this manner requires the leading edge 20 of the endplates 17 to penetrate the waves 21 to the height of the waves 21. With prior art endplates this would incur unacceptably high drag and/or divergence problems.

Figure 7A:
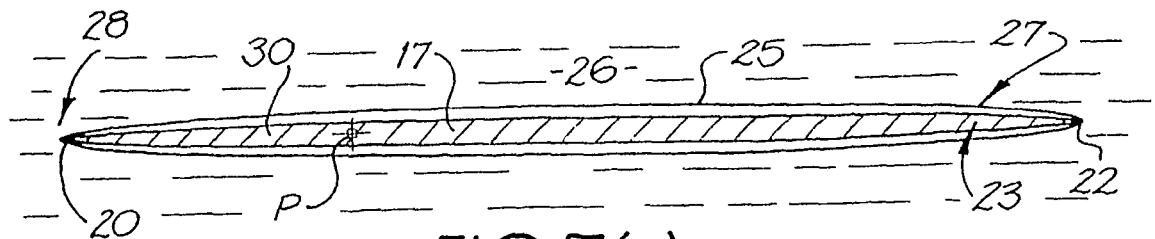
FIG. 7(a) is a cross sectional plan view of an endplate of the WIG of FIG. 6(a).
Figure 7B:
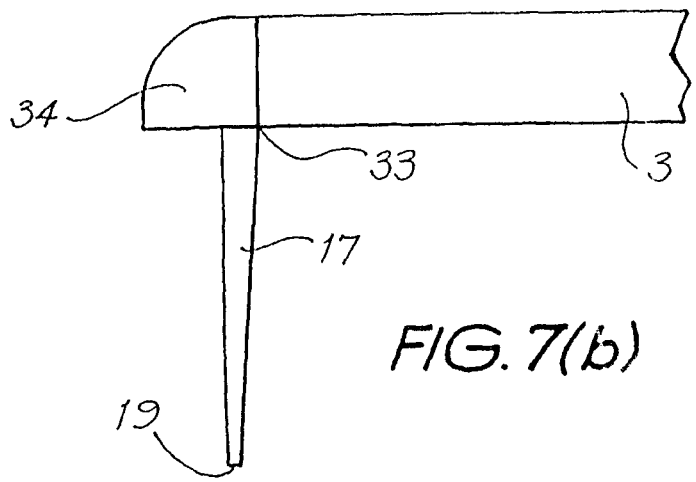
FIG. 7(b) is a fragmentary front elevation view of the endplate of FIG. 7(a) and adjacent wing structure.

An endplate 17 according to the preferred embodiment is depicted in plan, front elevation and side views in FIGS. 7(a) though 7(c). The forward portion 30 of the endplate includes a nose 28 defining the leading edge 20 of the endplate. The nose 28 is configured to generate an air-filled cavity 25 between each lateral side of the endplate and water 26 which passes over the endplate 17 in use when immersed. This cavity 25 is open to the surface of the water, and is accordingly ventilated by air from above the water surface 9. The nose 28 is configured such that it is supercavitating when at a zero yaw condition (zero yaw with respect to water flow) at the design cruise speed with the endplate immersed in water to the design immersion depth. A supercavity 25 is thus generated, being a cavity formed extending aft over the length of, and thereby encapsulating, the endplate. As there is no contact between the sides of the endplate and water 26 outside of the cavity, there are no frictional drag forces or divergent side forces between the water 26 and the endplate 17. In the context of this specification, a cavity extending over substantially the entire length of the endplate, but wetting the trailing edge still defines a supercavity.

The profile drag of a supercavitating endplate 17 is proportional to the size of the cavity 25. To minimise the profile drag the endplate 17 should accordingly be designed such that the cavity 25 is not much larger than the endplate 17. A problem then arises that when the endplate 17 experiences a significant angle of yaw, the aft portion 27 of the cavity 25 will move to one side so that the water 26 impacts on the aft portion 23 of the endplate 17. This will produce a large side force on the upstream side of the endplate, resulting in the endplate needing to be designed with sufficient structural strength to sustain these forces. This results in excessively thick and rigid endplate structures such as those of the prior art. The structural requirement for thick endplates results in large drag forces, such that no real drag reduction benefit is achieved.

Displacement of the aft portion 27 of the cavity 25 under yaw such that the water 26 outside of the cavity 25 impacts on the endplate also leads to friction drag between the endplate 17 and the water 26. The additional drag incurred when the water 26 contacts the aft portion 23 of the endplate increases with the side force on the endplate 17.

These problems are overcome in preferred embodiments of the present invention by configuring the endplate such that the trailing edge 22 of the endplate 17 is laterally displaceable with respect to the wing tip portion by water flowing over the endplate, while at least part of the forward portion of the endplate 17 is laterally fixed. This provides a weathercock effect, such that when the endplate tends to yaw, water passing over the endplate on the upstream side will impart a side force on the endplate aft portion 23 where there is contact with the water 26 outside of the cavity 25, displacing the trailing edge 22 of the endplate toward the center of the cavity 25, aligning the endplate aft portion 23 with the waterflow.

In the preferred embodiment of the present invention, the lateral displacement of the trailing edge 22 is provided by pivotably mounting the endplate 17 about a pivot axis P extending in a span-wise direction of the endplate. The forward portion of the endplate is accordingly laterally fixed at the pivot axis P, allowing the endplate to pivot in the same manner as a weathervane.

The endplate pivot axis P should be located forward of the hydrodynamic centre of pressure of the endplate at design conditions of design cruise speed with the endplate immersed to a design depth, with the inflow at an angle of yaw. The most forward location of the centre of pressure will occur when the speed is low enough to wet the entire endplate 17 length, such that no cavity is generated. For this fully wetted condition, the centre of pressure will generally always be further aft than 0.25 times the endplate chord length aft of the endplate leading edge 20 (particularly if the aft portion of the endplate is longer, and accordingly more deeply immersed, than the forward portion of the endplate). Accordingly if the pivot axis is forward of this point, at say 0.2 times the chord length aft of the leading edge, the endplate 17 will weathervane at all speeds and will not be subjected to large side loads due to yaw. If the endplate 17 is assumed to be rigid there will thus be no cause for divergence. The pivot axis P could alternatively be located aft of the hydrodynamic centre of pressure for some flight conditions if rotation of the endplate about the pivot axis were actively controlled by flight control actuators.

Rather than have the entire endplate 17 pivot about the pivot axis P, an alternative solution would be to have the front portion of the endplate 17 fixed and the aft portion pivotably mounted about the pivot axis P.

As an alternative to pivoting the aft portion of the endplate, or the entire endplate, the front portion of the endplate could be fixed with the aft portion of the endplate laterally flexible and mounted to the endplate forward portion. If the endplate aft portion is flexible, the lower immersed region of the endplate aft portion is able to 'give' somewhat, without needing to rotate the endplate 17 to the same degree as if it was stiff, or without rotating the endplate at all. This 'giving' tends to align the endplate aft portion with the waterflow, reducing the side force on the endplate and the resulting drag. The flexed endplate 17 also uses its stored energy to realign itself when the angle of yaw is decreased. In embodiments where flexibility of the endplate aft portion is entirely relied on for relieving side force, it is preferred that at least the aft 75% of the endplate is flexible, leaving up to the forward 25% of the endplate fixed.

The increased water pressure at depth produces a narrower cavity 25 at greater depths, which requires a thinner endplate. Tapering the endplates 17 from the root 33 to the tip 19 helps achieve the desired flexibility of the aft portion of the endplate mentioned above. The leading edge 20 of the endplate 17 can be vertical or raked aft (depicted in phantom as a raked leading edge 20A in FIG. 7(c)) to lower the spray angle and increase the stability of the leading edge.

There is a pressure differential between the laterally inward and outward facing side surfaces of the endplates 17 caused by lift generated by the wing structure 3. It is thus preferred that the endplates are curved inwards toward the centre of the vehicle at the leading and trailing edges 20, 22 and at the endplate tip 19, particularly if the endplate aft portion is made flexible as described above. The endplates 17 are also tapered toward the leading and trailing edges 20, 22.

With a smooth sea and no wind the WIG is flown at a height so that the endplate tips 19 are slightly below the surface 9 of the water 26. Gravity causes the base of the cavity to rise from the leading edge 20 to the trailing edge 22. The endplate tips 19 may be deeper at the trailing edge 22 than the leading edge 20 to exacerbate this effect such that the lower region of the aft portion of the endplate is always more in contact with the water than the lower region of the forward portion. This moves the hydrodynamic centre of pressure further aft of the pivot axis P so that the endplate 17 pivots and aligns itself to the water flow.

Figure 7C:
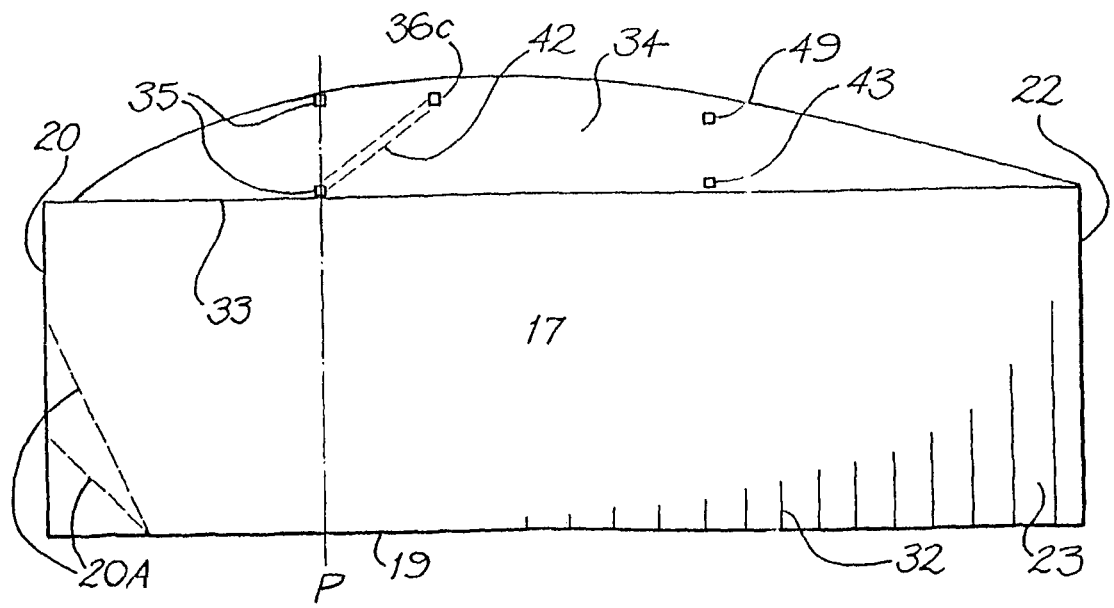
FIG. 7(c) is a side elevation view of the endplate and wing structure of FIG. 7(b).
Figure 7D:
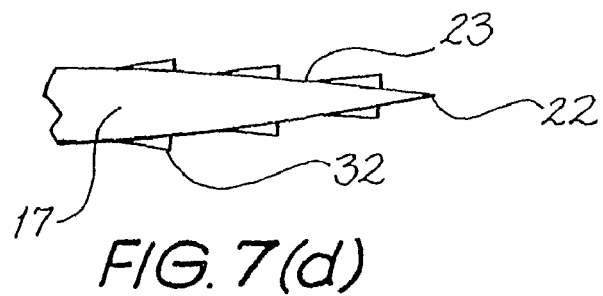
FIG. 7(d) is a fragmentary cross sectional plan view of the aft portion of the endplate of FIG. 7(a).

As depicted in FIGS. 7(c) and 7(d), the endplates may be provided with a plurality of wedge-shaped members 32 secured to a lower region of the aft portion 23 of the endplate that is immersed when the endplate is immersed to the design immersion depth. These wedges 32 assist the weathercock stabilising effect when the endplates 17 are subject to increasing yaw angles, which may occur with increasing wind and wave action. This causes the back part 27 of the cavity 25 to move from side to side so that the water impacts on the wedges 32. These wedges 32 direct the water away from the side of the endplate 17, maintaining the supercavity. The sideways force on the wedges produced by this contact with the water again pivots the endplates 17 around the pivot axis P (or flexes the aft portion in fixed endplate embodiments with a flexible aft portion), so that the endplate 17 aligns itself again with the water flow and the centre of the cavity 25. Although the wedges 32 incur a profile drag it has been found that the total drag is less than that for a smooth surface if the speed of the WIG is above 100 knots (51 m/s) for an immersion depth of 12' (3660 mm). Because the wedges 32 incur additional air drag compared to a smooth surface, it does not pay to cover the total surface of the endplates 17 with these wedges 32, but only the lower region of the aft portion 23 where the water contact is incurred.

Utilising the above mechanisms to provide a weathercock stabilising effect, aligning at least the aft portion 23 of the endplates 17 with the waterflow when subject to yaw, severe side forces, mechanical failure and the bulk of the water/endplate friction drag are eliminated.

The above passive weathercock type mechanisms are the preferred embodiments of the present invention. However, state of the art sensors, computers and hydraulics are capable of actively aligning the endplates 17 with the water flow if required. As discussed above, this will be particularly appropriate if the pivot axis is too far aft to provide a passive weathercock effect at some slower speeds.

Figure 8:
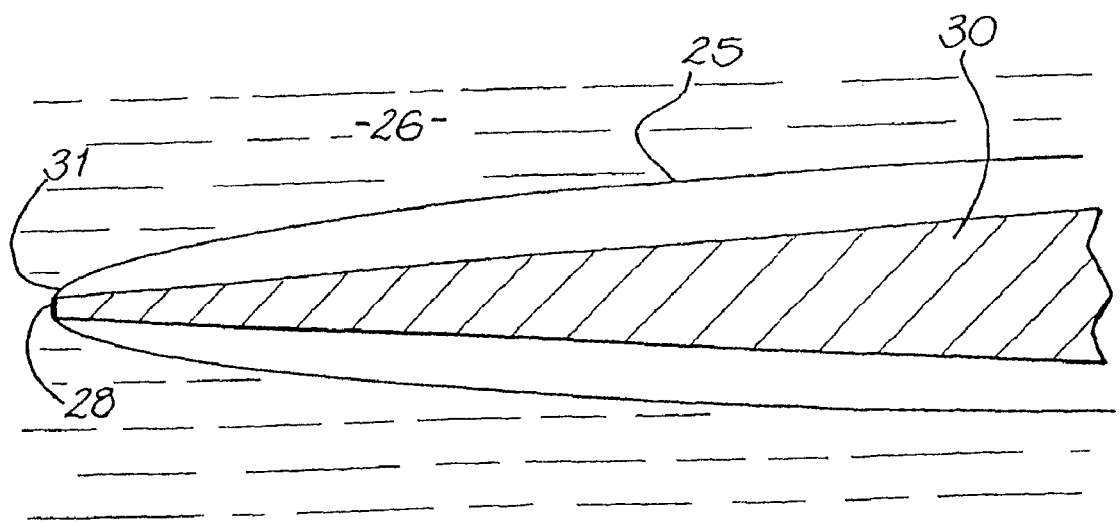
FIG. 8 is an enlarged fragmentary cross sectional plan view of the endplate of FIG. 7(a).

Commercial WIGs of the basic designs shown in FIGS. 1(a) to 1(c) and 6(a) to 6(c) have a design cruise speed greater than 150 knots (77 m/s). At these relatively high speeds there are numerous nose shapes that will produce a supercavity 25 when the endplate is immersed to a design depth (typically from about 4 feet (1220 mm) and up to about to 13 feet (4000 mm) for sea state 4), including concave, convex, wedge, semicircular, parabolic, elliptical, circular arc and many more. Any of these shapes can produce a supercavity but the preferred nose shape, as depicted in FIG. 8, is a flat nose 28 lying in a plane perpendicular to the chord-wise direction of the endplate.

Figure 9:
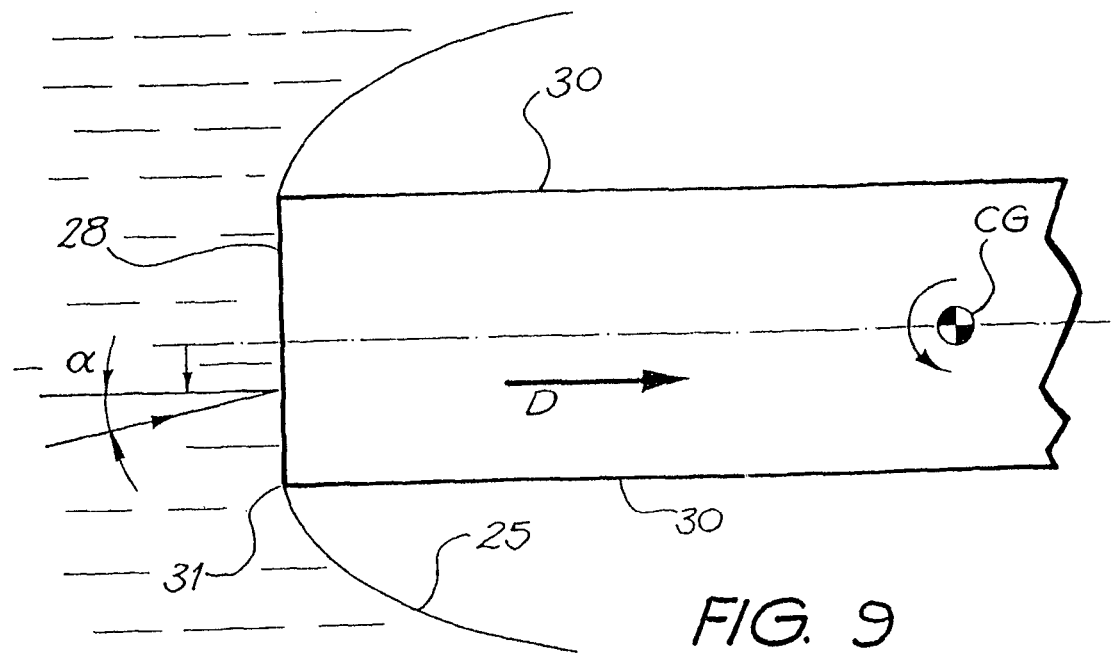
FIG. 9 is a fragmentary cross sectional plan view of a flat nosed endplate depicting drag forces in a yaw condition.

With reference to FIG. 9, a flat nose 28 can be shown to be hydrodynamically stable. When an endplate with a flat nose 28 is subject to a yaw angle $\alpha$, the hydrodynamic centre of pressure acting on the nose moves towards the upstream side of the nose 28. The resultant drag force D, which acts perpendicular to the flat surface of the nose 28, provides a stabilising negative twisting moment about the centre of gravity (CG) (and the pivot axis P for a pivoting endplate). This negative twisting moment turns the nose of the endplate 17 towards the direction of the incoming water rather than away from it. This stabilising moment complements the stabilising weathercock effect discussed above. Even when subjected to an angle of yaw, the waterflow detaches at the lateral edges 31 of the nose, generating the supercavity 25 at the nose edges and leaving the sides of the endplate forward portion 30 unwetted. This ensures that no side forces are exerted on the sides of the endplate forward portion 25, which would otherwise produce an unstable positive twisting moment. The flat nose is accordingly hydrodynamically stable and not subject to divergence.

Figure 10:
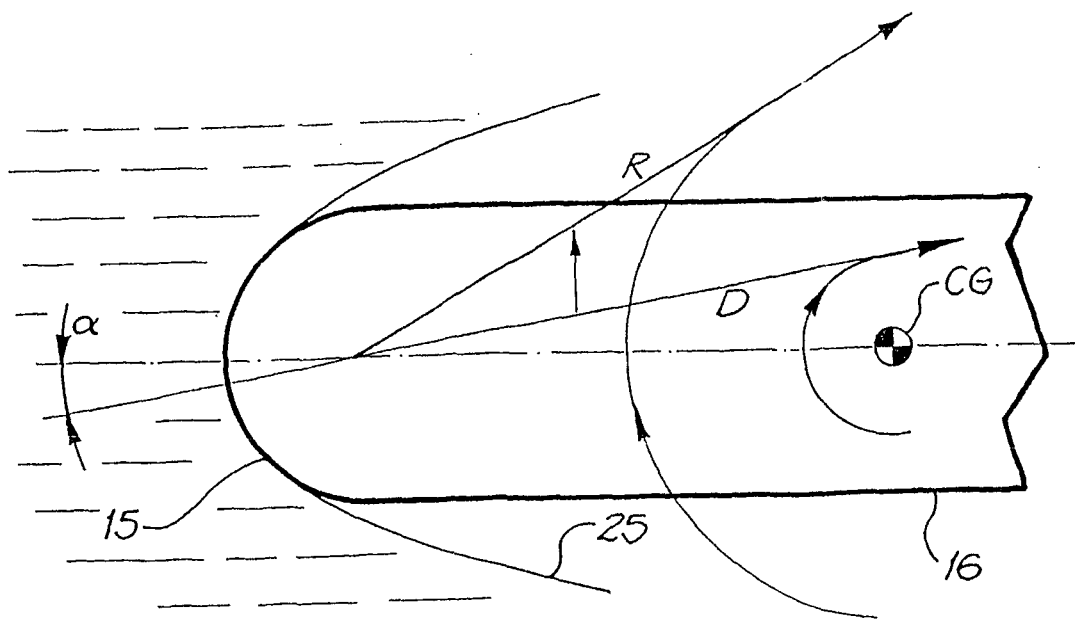
FIG. 10 is a fragmentary cross sectional plan view of a round nosed endplate depicting drag forces in a yaw condition.

The stabilising negative twisting moment of the flat nose 28 can be compared with the destabilising positive twisting moment of a semicircular nose 15 as depicted in FIG. 10. With this configuration, the hydrodynamic centre of pressure again moves toward the upstream side of the nose 15, but given the convex surface of the nose, the drag force D acting perpendicular to the surface, coupled with a force generated by pressure acting on the wetted area of the nose on the upstream side, provides a resultant force R with an unstable positive moment about the centre of gravity (CG). A wedge shaped nose or any other shaped nose that is wetted on the side will also be unstable in the same way.

A flat nose is also easy and inexpensive to manufacture to the desired shape. This is important as the nose 28 shape decides the cavity 25 size which in turn determines the drag. If the cavity 25 is too large the profile drag will be too large and if the cavity 25 is too small the water 26 will contact the sides of the endplate 17, also causing excessive drag. In service the nose 28 will receive regular minor damage from impacting with small objects. This damage can be repaired easily in situ by simply grinding the damaged area flat. A complicated nose shape would require the removal and replacement of the damaged part.

The flat nose shape also minimises surface cavitation as the water ventilates cleanly when it leaves the square corner 31. In contrast a convex shape would likely suffer from surface cavitation that would eat away and destroy the desired shape.

The drag of a supercavitating shape is proportional to the size of the cavity 25 it produces. Whilst a flat nose 28 produces a larger cavity 25 than a streamlined nose of the same width, the desired cavity size can be produced with a flat nose by reducing the width of the nose 28. Therefore there is no drag penalty through using a non-streamlined nose shape.

To minimise the drag of the endplate, the thickness of the flat nose 20 should be selected so that the length of the supercavity 25 generated at a design cruise speed with the plate immersed to a design immersion depth is slightly longer than the chord length of the endplate, such that the entire endplate will be unwetted without the supercavity being excessively large, which would result in a large profile drag. A supercavity length of less than 5 times the chord length, and more particularly less than twice the chord length, over at least the lower 50% of the immersed lower region of the endplate is preferred.

Tests were carried out on a model of the endplate according to the preferred embodiment in a high-speed, variable-pressure, water channel with the cavitation and Froude numbers properly scaled. The experimental data obtained enabled the development of empirical equations which enable the selection of the nose width. Based on the experimental data, the ratio of cavity length to nose width can be expressed as:

$$\frac{l}{h} = \frac{20 C_d}{\sigma} \quad (1a)$$

where:

$$\sigma = \frac{\rho g H}{1/2 \rho V^2}$$

l=cavity length,
h=nose width,
g=acceleration due to gravity=32.2 ft/s² (9.81 m/s²),
H=endplate immersion depth,
V=vehicle speed
ρ=density of water, and
$C_d$ is the classical drag coefficient for a ventilated, supercavitating flat plate normal to the flow, with:

$$C_d = \frac{2\pi}{\pi + 4} = 0.88 \quad (1b)$$

Equation (1a) is in large disagreement with the linearised result given in the literature, such as in the report "The Shape of Cavities in Supercavitating Flow" (Proc. 11th Int. Cong. of Appl. Mech., 1964) by M. P. Tulin (hereinafter referred to as the Tulin Report), where $l/h = (8/\pi$ or $\pi/2)C_d/\sigma^2$ depending on the model used in the derivation of the equations. The large difference is probably attributable to free surface and gravity effects.

Using the empirical equation (1a) for the cavity length behind a flat nose, the nose width required to completely unwet an endplate of chord length L immersed to a depth H at a speed V, is:

$$h = \frac{gHL}{10 C_d V^2} \quad (2)$$

For example, for the flat plate nose, $C_d=0.88$ and for H=12' (3.7 m), L=60' (18.3 m) and V=200 knots (103 m/s) equation (2) gives h=0.02' (6 mm)

Furthermore, equations (1a) and (1b) may be used to derive the following equation to estimate the area of the plate that is wetted for any value of h, H, L, and V.

$$\frac{S_W}{HL} = 1 - \frac{C}{HL}\left(1 + l_n \frac{HL}{C}\right), \frac{C}{L} \leq H \quad (3)$$

where $S_w$=wetted area, and $$C = \frac{20 C_d V^2 h}{2g}$$

The drag (D) of the endplate may then be shown to be:

$$\frac{D}{2 C_f HL 1/2 \rho V^2} \approx \frac{S_W}{HL} + \frac{C_d h}{2 C_f L} \quad (4)$$

where $C_f$=skin friction coefficient.

Figure 11:
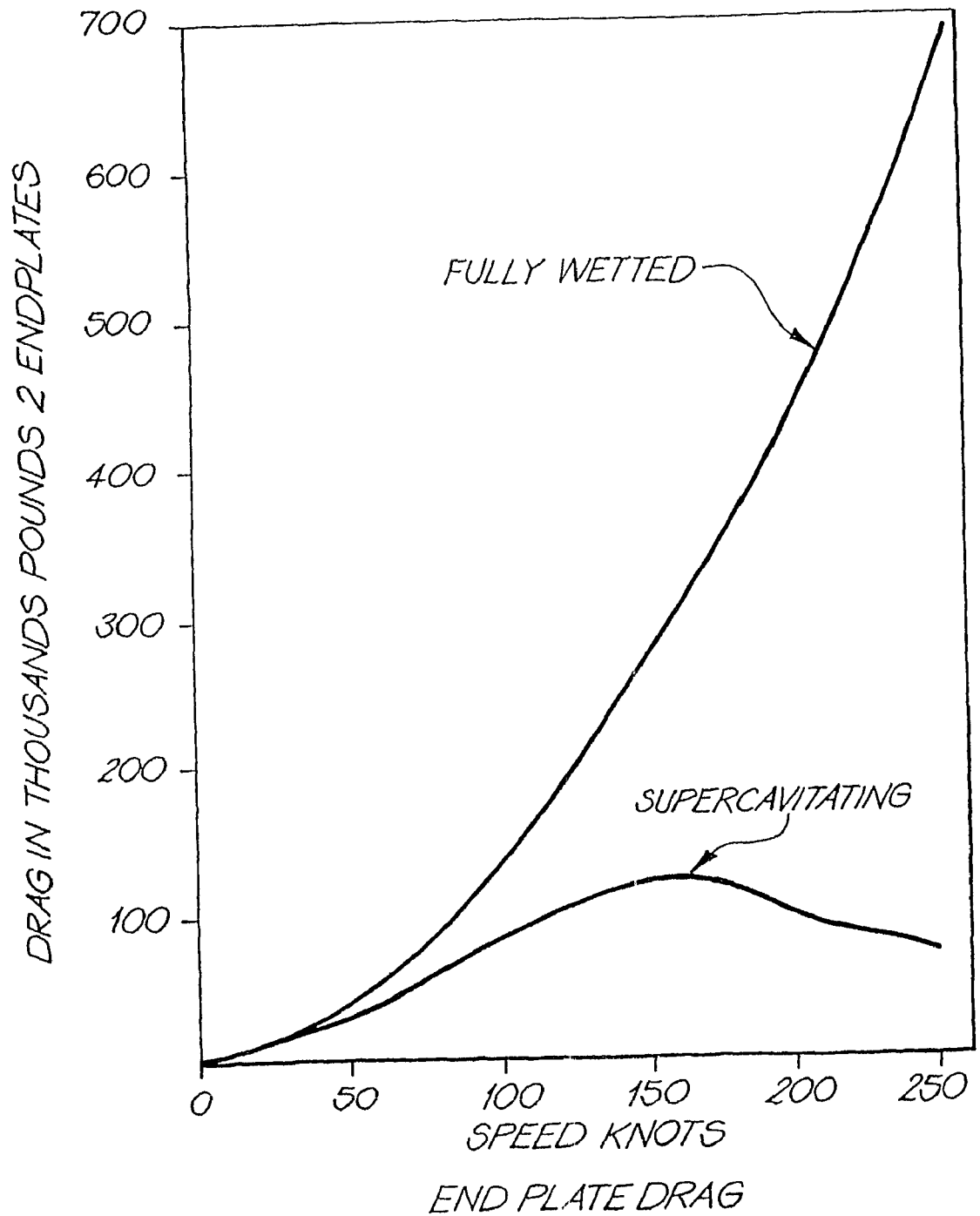
FIG. 11 is a graph depicting drag versus speed for fully wetted and supercavitating endplates.

FIG. 11 provides a comparison of the estimated total drag at varying speeds for a supercavitating flat nosed endplate according to the example (h=0.02', H=12', L=60') as compared to an equivalent fully wetted endplate. Again for the flat nose, $C_d=0.88$. The total drag for the wetted plate is obtained from:

$$D(\text{fully wetted}) = 4 C_f HL(\tfrac{1}{2}\sigma V^2) \quad (5)$$

The experiments also revealed that the cavity maximum thickness occurred at approximately half the cavity length and could be estimated by the following empirical equation.

$$\frac{t_{max}}{h} = \text{approx.} \frac{11}{\sigma^{1/3}} \quad (6)$$

where $t_{max}$ is the cavity maximum thickness.

The Tulin Report states that the cavity shape is approximately elliptical downstream from the body creating the cavity, with the cavity maximum thickness again occurring at approximately half the cavity length.

If the nose width is specified at any vertical location along its span, equations (1)–(6) determine the cavity length and maximum thickness at that depth H.

In a preliminary design the endplate thickness may be chosen to be, say 0.75 $t_{max}$, so as to be well inside the cavity. Taking the cavity to be elliptical its cross section is now determined. However its shape near the nose must be adjusted for the well-known theoretical cavity shape behind a flat plate.

Figure 12B:
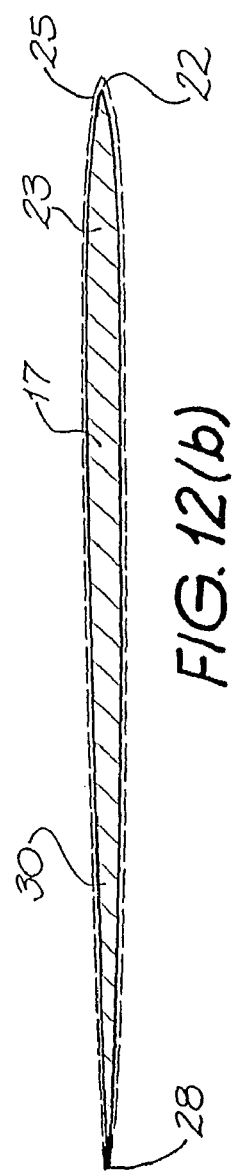
FIG. 12(b) is a cross sectional plan view of the endplate of FIG. 12(a) taken at section AA.
Figure 12C:
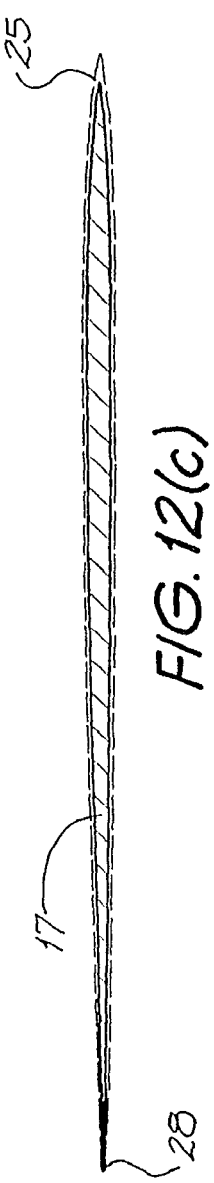
FIG. 12(c) is a cross sectional plan view of the endplate of FIG. 12(a) taken at section BB.
Figure 12D:
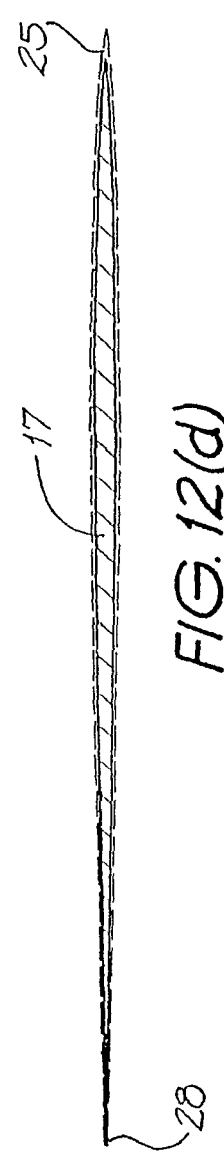
FIG. 12(d) is a cross sectional plan view of the endplate of FIG. 12(a) taken at section CC.
Figure 12A:
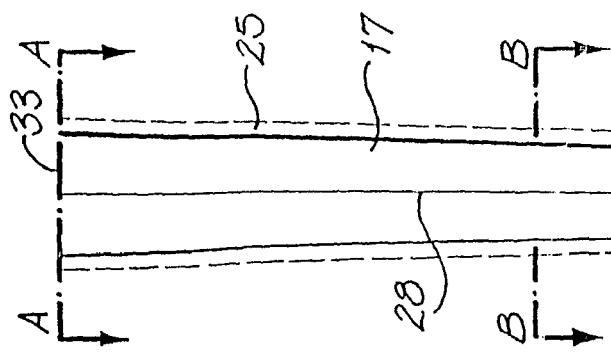
FIG. 12(a) is a fragmentary front elevation view of an endplate according to a preferred embodiment of the present invention.
Figure 12A:
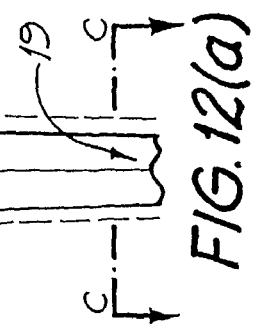

FIGS. 12(a) to 12(d) show the resulting design for a constant nose 28 thickness of 0.02' (6 mm). FIG. 12(a) depicts a front elevation view of the immersed bottom 12' (3.7 m) of the endplate from the water surface 9. FIGS. 12(b) to 12(d) provide cross sectional views taken at the water surface 9 (Section A—A), midway between the water surface and the endplate tip (Section B—B) and at the endplate tip 19 (Section C—C). The maximum thickness of the endplate at these three sections is 1.6' (488 mm), 1.25' (381 mm) and 1.0' (305 mm) respectively. These maximum thicknesses are 75% of the expected cavity 25 thickness generated by the 0.02' (6 mm) thick nose 28 at a speed of 250 knots (129 m/s). The cavity 25 is depicted in phantom and can be seen to begin at the endplate flat nose 28 and extend beyond the trailing edge 22 of the endplate. To reduce drag, the endplate 17 is faired toward the trailing edge 22 over a distance approximately 5 times the thickness of the endplate 17 at the point of tangency of the fairing.

As noted above, the design depicted in FIGS. 12(a) to 12(d) is based on selecting the endplate maximum thickness to be 0.75 $t_{max}$ of the cavity. In some cases it may be necessary to reduce the thickness of the plate to achieve complete ventilation of the cavity. For a nose thickness of 0.02' (6 mm), however, the endplate thickness probably cannot be made much thinner and still maintain its structural integrity. As described above the endplates 17 experience a side force because of the pressure differential between the air on the inside and the outside of the endplates caused by the lift of the wing. Whilst the endplate forward portion 30 must be made very thin to fit inside the cavity, it must be of sufficient lateral stiffness to resist the above mentioned side force. The endplate forward portion 30 might be made of solid steel or titanium for strength and stiffness. With the endplate forward portion 30 being tapered, its thickness increases with the distance from the leading edge 28. With high pressure differentials caused by high wing loadings it may be appropriate to extend the endplate forward portion 30 forward of the wing leading edge 11. This is so sufficient thickness and strength can be achieved at the point adjacent to the wing leading edge 11, where the pressure differential becomes significant.

In some situations it might be appropriate to increase the nose thickness with an associated drag penalty in order to provide a structurally sound and fully ventilated design. It should be noted that the drag of the 0.02' (6 mm) nose is so much less than the drag of the designs in the Barkley and Moore Reports that the drag of a flat nose design will remain much lower than the Barkley and Moore designs even if the nose width is increased by five or even ten times. In fact, the nose width must be increased by 140 times to equal the drag of the Barkley and Moore designs if operated at 12' (3.7 mm) immersion depth and using the drag they report.

Figure 12E:
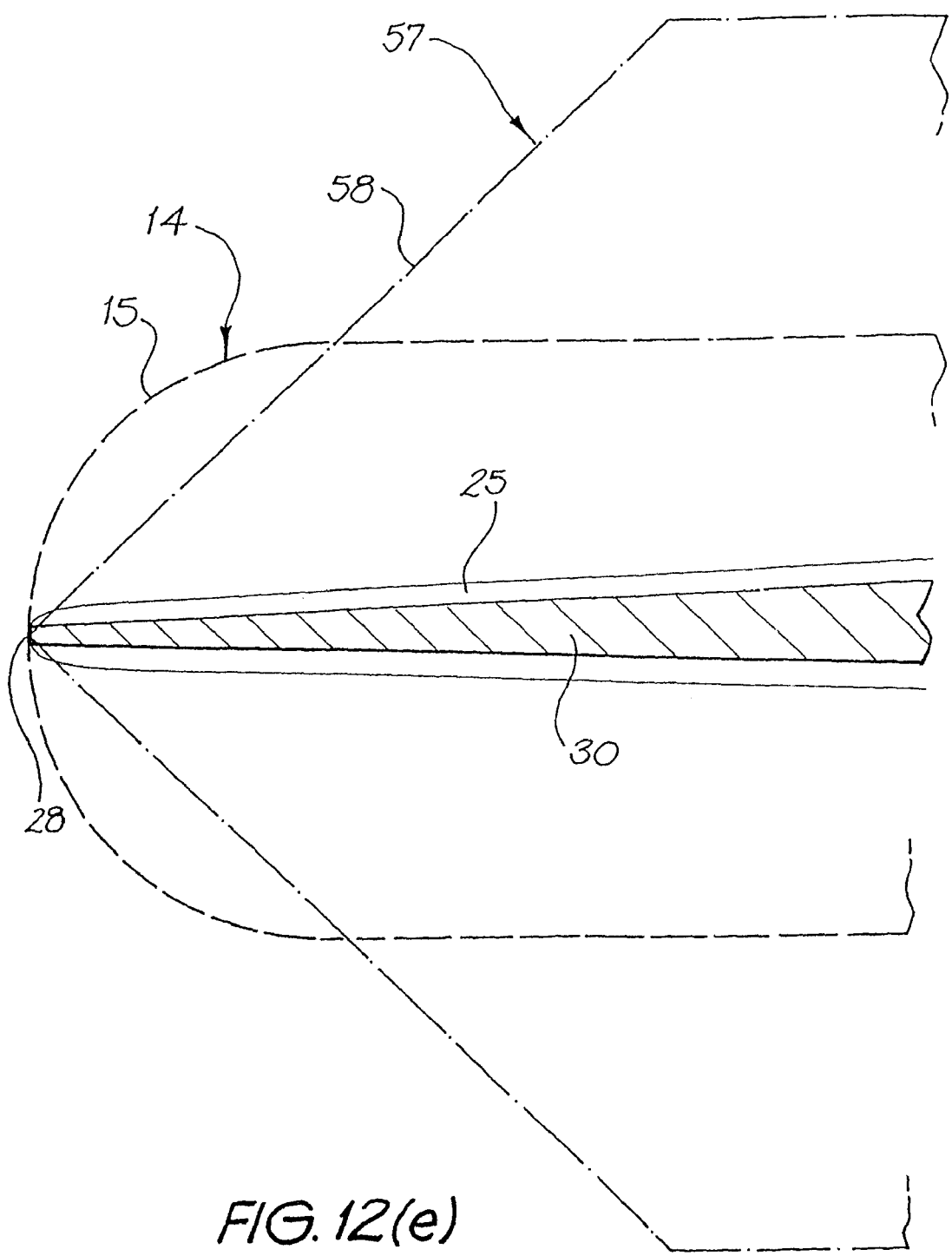
FIG. 12(e) is a fragmentary cross sectional plan view of the forward portion of various endplates.

FIG. 12(e) depicts the forward end portion 30 of the endplate 17 of the preferred embodiment design described above, with a flat nose 28 generating a narrow cavity 25. The endplate 17 is overlaid with scaled versions of the forward portion of two prior art endplates according to the Barkely and Moore Reports. Model 1 of the Barkley Report provides an endplate 14 with a rounded nose 15 and forward portion 16 which has a thickness of 1% of the chord length. The Moore endplate 57 has a wedge nose 58 and 2.2% thick forward portion. The wedge nose of the 4% thick endplate proposed by the Barkley Report model No. 4 (not shown) is thicker again. In comparison, the forward portion 30 of the endplate 17 has a thickness of approximately 0.1% of the endplate 17 chord length when measured at 1% of the endplate chord length aft of the leading edge 28. This is an order of magnitude thinner than the prior art thin endplates which rely on thickness to achieve strength and stability rather than by being hydrodynamically stable.

As these prior art noses 15, 56, 58 and forward portions fit outside the small sized cavity 25 generated by the flat nose 28 of the preferred embodiment of the present invention, they require or would generate unworkably large cavities creating drag at least an order of magnitude larger than the flat nosed endplate 17 which, for a 60' (18 m) long endplate has a drag coefficient of about 0.00029 at a design cruise speed of 250 knots (129 m/s) and a design immersion depth of 12' (3600 mm). This drag coefficient is based on the submerged area of the endplate.

Figure 13:
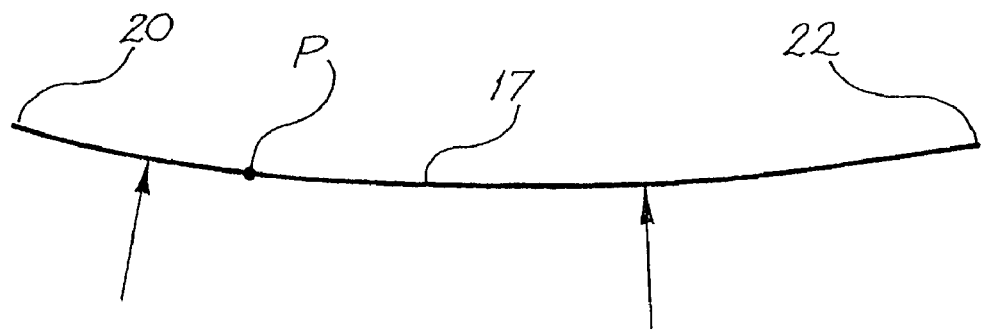
FIG. 13 is a schematic plan view of a flexed endplate.

Whilst there will be no cause for divergence with the above described endplate embodiments of the present invention if the endplates (or at least the forward portions thereof) are assumed to be rigid, the endplates will always exhibit some degree of flexibility. At slow speeds where at least part of the endplate sides are wetted, excessive flexibility of the endplate may cause a particular form of divergence. With reference to FIG. 13, the endplate 17 will tend to bend about the pivot axis P when subjected to a minute yaw angle α. Water pressure acting on the upstream side of any wetted area of the forward deflected portion of the endplate will produce an unstable moment, tending to further deflect the forward portion of the endplate 17 and potentially result in divergence. If the side forces acting on the yawed endplate produce an adverse hydrodynamic moment per degree of yaw that is greater than the structural stiffness of the endplate per degree of yaw, divergence is possible.

Figure 14:
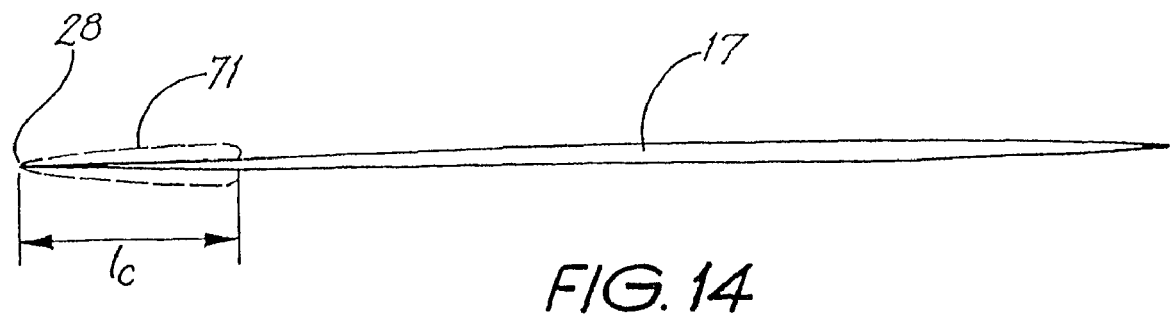
FIG. 14 is a cross sectional plan view of the endplate of FIG. 12(a) generating a leading edge cavity.

FIG. 14 depicts an endplate cross section with a cavity 71 of length $l_c$, generated by the nose at low speeds. The cavity 71 extends from the leading edge, with the flow reattaching downstream to leave the remainder of the sides of the endplate wetted. The approximate length of the cavity 71 is given by equations (1a) and (1b) above. Clearly, the leading edge cavity length will have a major effect on the tendency to diverge. For example, equations (1) and (2) may be used to show that for H=12' (3.7 m) and h=0.02' (6 mm), the cavity length $l_c$ will be 12' (3.7 m) at a speed of 95 knots (49 m/s). Accordingly, for an endplate where the pivot axis P is located 12' (3.7 m) aft of the endplate leading edge, the entire forward portion 30 forward of the pivot axis P will remain unwetted and there will be no adverse moment created, therefore divergence is not possible.

The magnitude of the moment (M) about a pivot axis P located 12' (3.7 m) aft of the leading edge, per degree of yaw (α), is approximately:

$$\frac{M}{\alpha} \approx \frac{\Delta P \frac{1}{2}\rho V^2}{\frac{1}{2}\rho V^2} \frac{(12' - l_c)^2}{2} \qquad (7)$$

where ΔP is the differential pressure applied to the wetted portion of the endplate forward of the pivot axis.

Equation (7) assumes that the mean value of ΔP across the wetted portion of the endplate has its centre of pressure at $(12-l_c)/2$. It is further assumed that $\Delta P/\tfrac{1}{2} \rho V^2$ is a constant and independent of the cavity length and if $l_c$ is replaced by the value given by equations (1a) and (1b), equation (7) becomes:

$$\frac{M}{\alpha} \approx \frac{const.\tfrac{1}{2}\rho V^2 (12-(17.76h)/2gH)V^2)^2}{2} \quad (8)$$

The maximum value of $M/\alpha$ in equation (8) occurs for H=12' (3.7 m) and for h=0.02' (6 mm) when:

$$V = 7.7/\sqrt{h} \text{ knots} \quad (9)$$
$$= 54.3 \text{ knots } (27.9 \, m/s)$$

This means that divergence is not likely to occur at speeds greater than 54 knots, but may occur at speeds less than 54 knots. The likelihood of divergence is then dependent on the method of construction of the endplate.

If the front 30% of the endplate were constructed of a structurally rigid material such as a titanium skin over a solid carbon matrix centre, careful analysis would be required to determine if the endplate would or would not diverge. This solid construction would however incur a large weight penalty. To save weight, lighter weight construction is desired, however such lighter weight constructions will be more flexible, and hence divergence would be more likely in the lower speed ranges.

One possible solution to this problem would be to increase the nose 28 thickness and thus the total endplate 17 thickness so as to provide a more rigid structure. This has the disadvantage, however, of increasing the drag, which is proportional to the nose thickness.

Figure 15A:
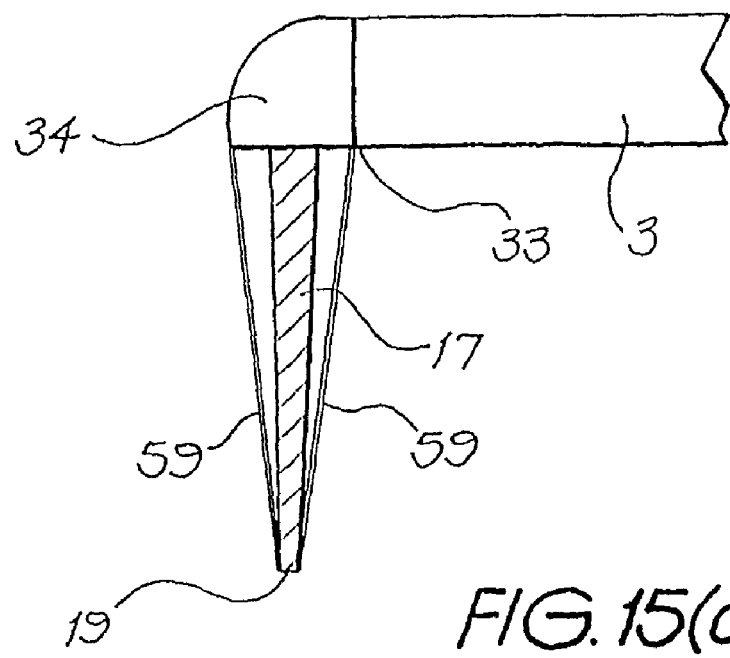
FIG. 15(a) is a fragmentary front elevation view of an endplate and adjacent wing structure with support struts.
Figure 15B:
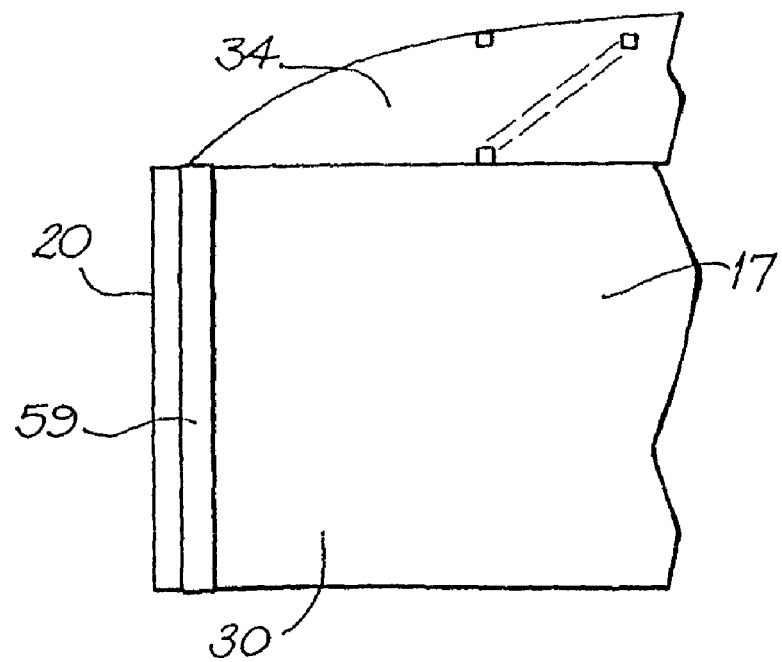
FIG. 15(b) is a side elevation view of the endplate of FIG. 15(a).

A preferred way of stiffening the forward portion 30 of the endplate is to support the endplate forward portion with a pair of support struts 59 as depicted in FIGS. 15(a) and 15(b). The struts 59 are provided on opposing sides of the endplate 17 and are each secured at their upper first end to the wing 3, here at the wing tip portion, and at their lower second end to the endplate 17 toward the tip 19. These struts 59 would act in tension and would typically be configured to have some of the low drag features of the endplates 17, i.e. supercavitating, ventilating, non-divergent, flat nose, thin cross-section, tapered to fit inside the strut 59 cavity. The upper end of the struts are here displaceable with respect to the wing 3 toward the endplate root 33, such that at supercavitating speeds the struts 59 can be drawn up next to the endplate 17, inside the endplate 17 cavity 25 for zero drag. This type of strut 59 can be used in any underwater situation where low drag at high speed is required.

The hydrodynamic moment about the pivot axis at a specific low speed depends on the length of the cavity 25 generated at that speed. For example, if the cavity length extends to the pivot axis P, as per the example above, there can be no adverse moment and no possibility of divergence. Consequently, it is possible to avoid divergence at any low speed if the nose 28 width could be temporarily increased to increase the length of the cavity 25.

The required flat nose 28 thickness can be calculated as above and any other method of diverting the water sideways from the leading edge 20 of the endplate 17, including the following will achieve the desired increase in cavity 25 size.

Figure 16A:
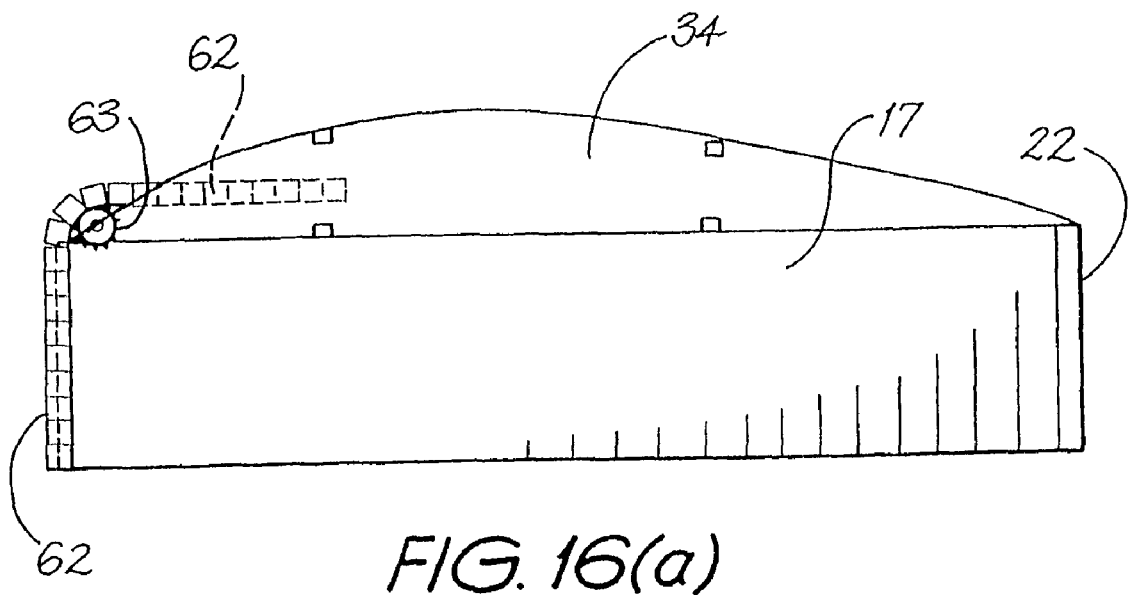
FIG. 16(a) is a side elevation view of an endplate with a leading edge device.
Figure 16B:
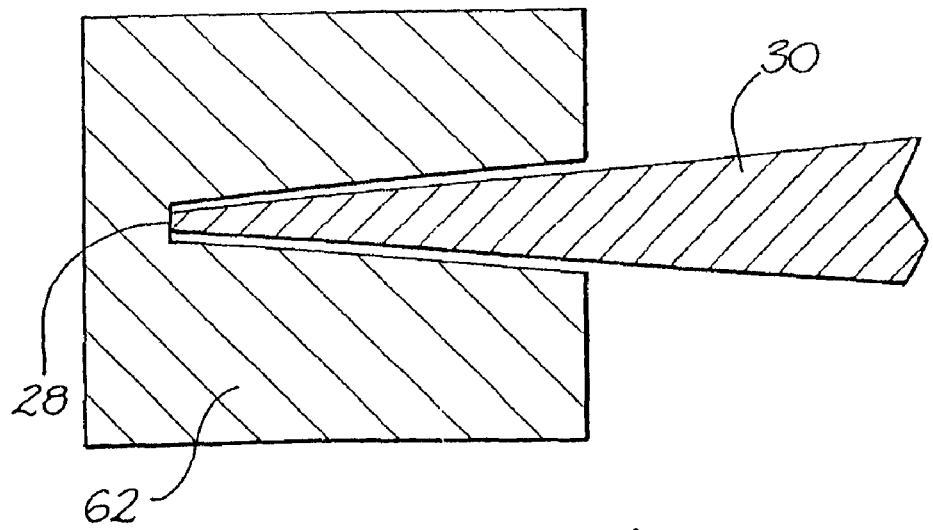
FIG. 16(b) is a fragmentary cross sectional plan view of the endplate of FIG. 16(a).

Referring to FIGS. 16(a) and 16(b), this temporary increased nose width can effectively be provided by a retractable leading edge device 62, of greater width that the endplate nose 28, which is extendable along and over the nose 28. This leading edge device, in the form of a thicker nose 62, is made in segments joined together in a chain so that it can be stored inside the wing tip portion and then lowered or raised by the toothed wheel 63 which slides the segments of the nose 62 down and up the outside of the regular nose 28. This system is, however, somewhat complex.

An alternative configuration is depicted in FIGS. 17(a) and 17(b) where protrusions in the form of flaps 60, configurable between a retracted position within the endplate and an extended position protruding beyond the endplate, are located on each opposing side of the endplate forward portion 30 behind the nose 28. At low speeds, the flaps engage water as the small cavity generated by the nose 28 tends to close, regenerating a further, larger cavity behind the flaps 60 which act as a large nose. It is preferred that the endplate forward portion 30 is provided with apertures 67 extending though the thickness thereof to reduce any destabilising sideforce caused in yaw if the forward portion 30 in front of the flaps is wetted. Here the forward portion 30 is formed of horizontal reinforcement plates 66 leaving large spaces 67 between the plates 66 for cross flow of water whilst maintaining lateral rigidity of the forward portion 30.

When the endplate is subject to yaw, even at supercavitating speeds, the flaps can be extended such that the flap 60 on the upstream side will engage water passing outside of the supercavity. The forward face of the flap 60 is flat and extends at right angles to the chord line of the endplate such that the pressure of the water impacting on the flap 60 will create a stabilising moment. The flaps 60 extend in the spanwise direction of the endplates and need only be provided in the lower immersed region of the endplates.

Flaps 60 will, however, potentially result in weakening of the endplate forward portion structure, and are mechanically complex.

In yaw a simple flap at or near the nose could be extended on one side when the yaw condition is sensed to temporarily increase the cavity width and avoid that side of the endplate from wetting. During extension of this flap, however, the resultant force acting on the flap, would act in front of the centre of gravity of the endplate resulting in a severe destabilising moment. At WIG speeds this would cause the endplate to fail unless it was made unduly thick resulting in a high drag. This alternative is therefore not suitable for a WIG.

Figure 18A:
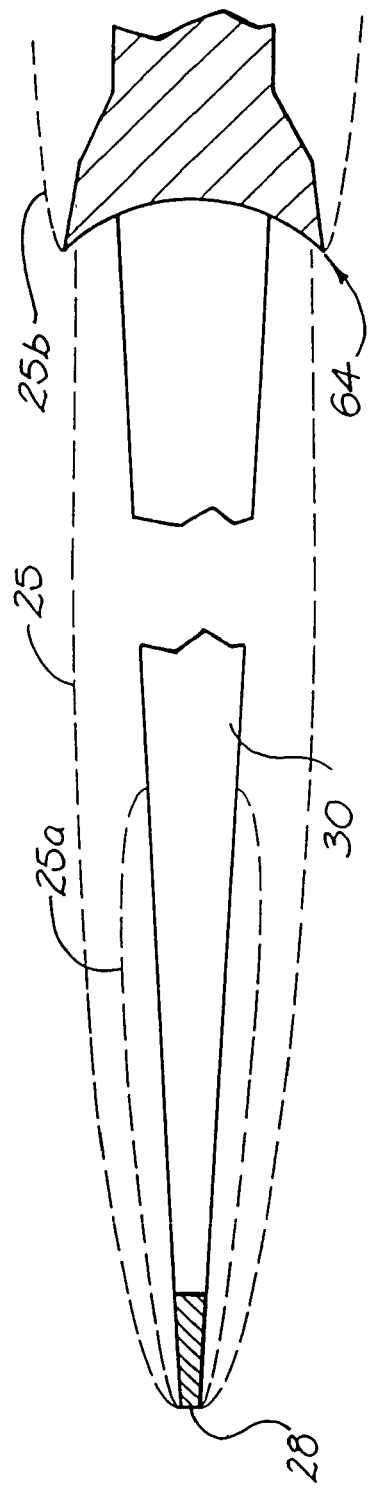
FIG. 18(a) is a fragmentary cross sectional plan view of an endplate with a fixed protrusion.
Figure 18B:
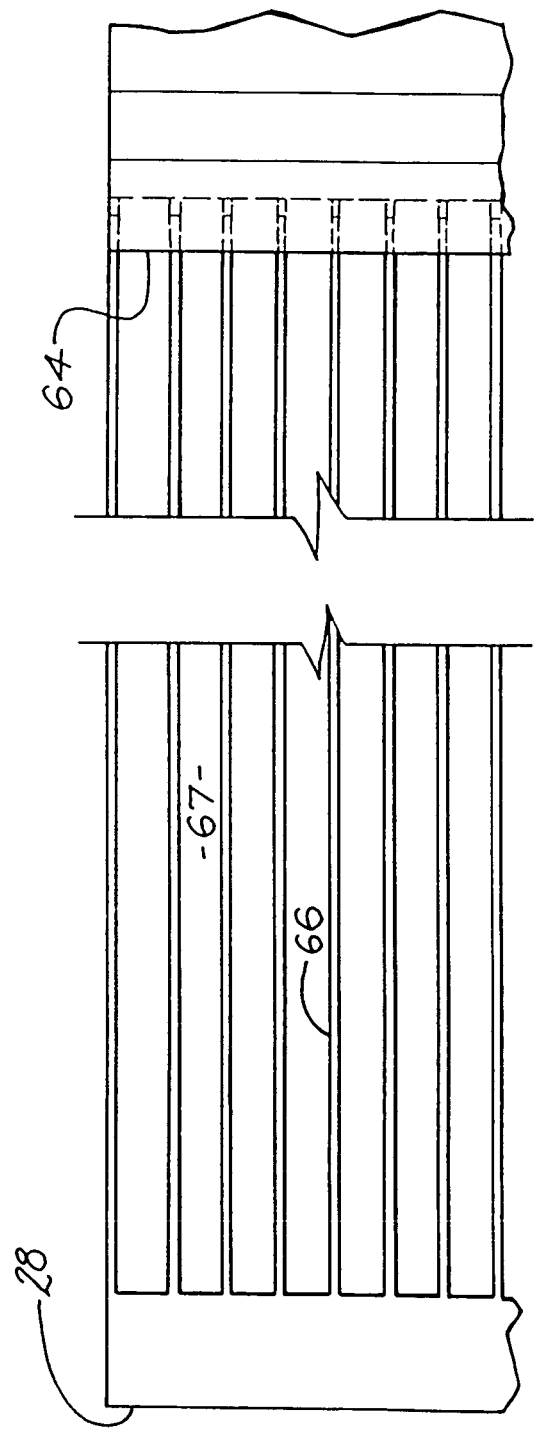
FIG. 18(b) is a side elevation view of the endplate of FIG. 18(a).

A simpler solution is provision of a fixed protrusion 64 on each side of the endplate forward portion 30 as depicted in FIGS. 18(a) and 18(b), effectively providing a two-stage nose.

Experiments in a water channel demonstrated that the cavity size could be increased at slower speeds by this passive design which has the additional advantage of increasing dynamic stability at increasing speeds.

As explained above, for the example endplate dimensions, divergence is most likely to occur at speeds less than 55 knots (28 m/s) because the leading edge cavities 25a are too short to relieve the hydrodynamic moment about the pivot axis P resulting from the wetted region forward of the pivot point P. Experiments show that if a protrusion, or second nose 64, whose total width is 0.25' (76 mm) is located about 2.5' (760 mm) downstream of the 0.02' (6 mm) wide nose 28, water will impact the protrusion 64 and create a second, much longer, cavity 25*b* that extends to the pivot axis P (12' aft of the leading edge) at about 20 knots (10 m/s). Thus the possibility of divergence is eliminated at speeds greater than about 15 knots (8 m/s). As the speed is increased the leading edge cavity 25 length increases and finally at speeds greater than about 100 knots (51 m/s) the leading edge cavity 25 completely clears and unwets the protrusion 64, thus eliminating the drag of the protrusion 64.

As per the embodiment of FIGS. 17(*a*) and 17(*b*), the endplate forward portion forward of the protrusion 64 is provided with apertures 67 extending through the thickness of the endplate, defined by horizontal reinforcement plates 66. This hollow space 67 allows the water to cross over from one side of the endplate to the other, thus avoiding sideways pressure on the forward portion 30 of the endplate and thereby avoiding divergence or failure in yaw. It also allows the water to come into contact with the full face of the protrusion 64 to create the larger cavity.

The front face of the protrusion is configured to be hydrodynamically stable, here being concave in form. In yaw, the cavity will move to one side and water on the upstream side of the endplate will impact on the front face of the protrusion at the upstream side. The centre of pressure applied by the water on the protrusion 64 will be on the upstream side of the endplate, and given that the front face is inclined forward as opposed to swept back, the resultant load acting perpendicular to the concave face will create a stabilising moment about the pivot axis (and centre of gravity) opposing any divergence. A concave protrusion 64 provides a significantly greater stabilising moment than would an equivalent flat protrusion once a reasonably large cavity has been formed.

A further advantage of this type of protrusion forming a second stage nose 64 is that it can be used to reduce the overall drag of the endplate 17. With a single stage nose 28, the nose width at the endplate tip 19 must be chosen to produce a large enough cavity 25 at the tip 19 when immersed to the design maximum immersion depth. This nose width 28 is approximately 6 times the appropriate width if it was only operating at the mean average wave height. For instance in sea state 4 the highest wave is approximately 13.3' (4050 mm) but the average wave height is only 4.2' (1280 mm). If the vehicle is flown such that the endplate tip remains just immersed at the trough of an average height wave, the mean immersion depth will be 4.2'/2=2.1' (640 mm).

The drag can therefore be reduced with a two stage nose by choosing a smaller nose thickness that would produce a sufficiently large cavity at 2' (610 mm) immersion depth and using the second stage nose to automatically increase the cavity size at increased depths in the same way that it automatically increases the cavity size at slower speeds. As the drag is proportional to the cavity size, this results in a lower average drag.

Figure 19A:
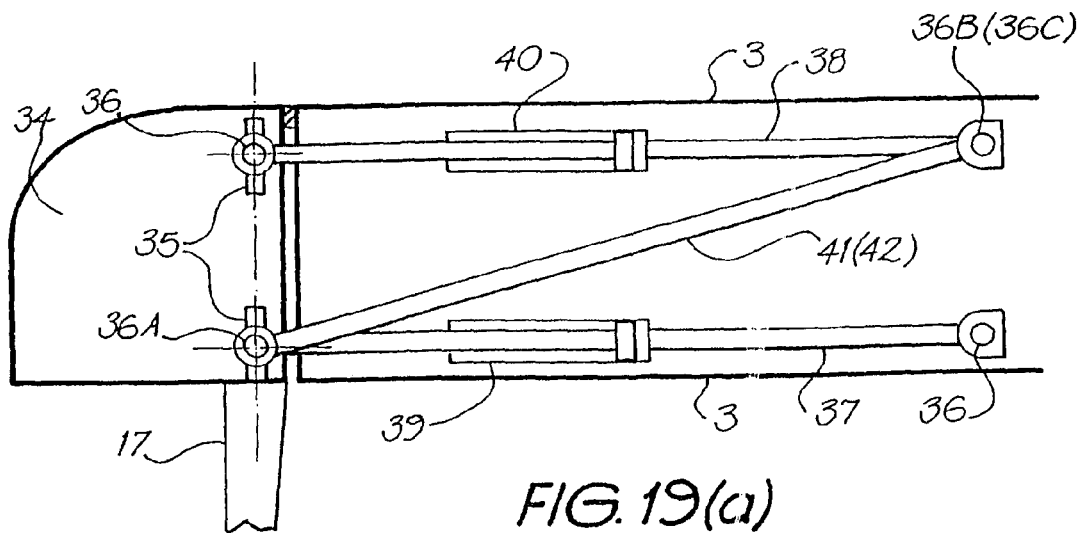
FIG. 19(a) is a cross sectional front elevation view of an endplate support structure, taken at a section immediately forward of the pivot axis.
Figure 19B:
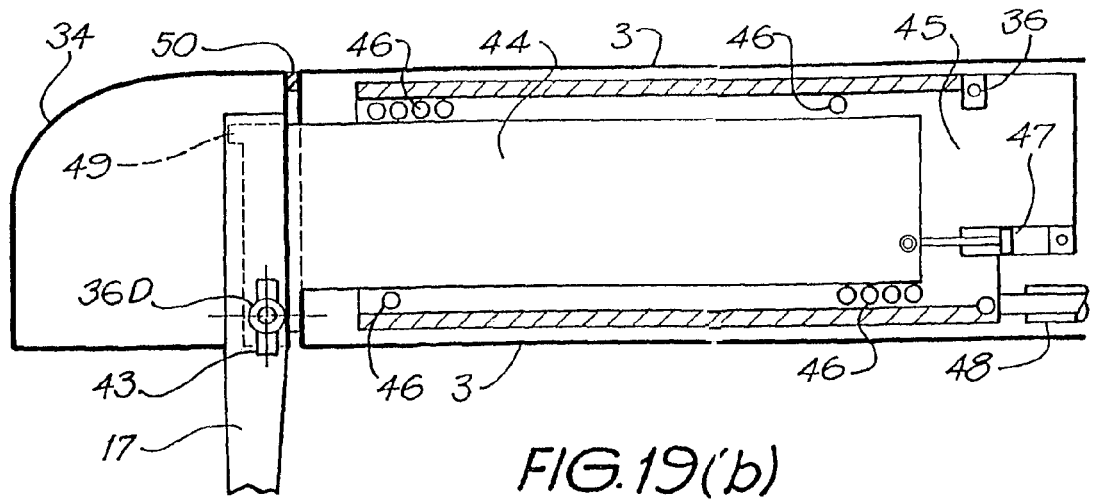
FIG. 19(b) is a fragmentary cross sectional front elevation view of the structure of 19(a) taken at a section aft of the pivot axis.
Figure 19C:
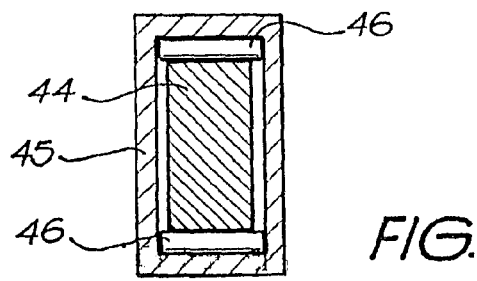
FIG. 19(c) is a cross sectional side elevation view of part of the structure of FIG. 19(b).

The structure used to pivotally mount the endplate 17, for pivoting embodiments, to the wingtip portion is depicted in FIGS. 19(*a*) to 19(*c*), with further reference to FIG. 7(*c*). The pivotal mounting about the pivot axis P is here provided by way of vertically aligned bearings 35 that allow the endplate 17 to rotate horizontally while still remaining vertical. The aft portion of the endplate is supported with a structure that allows the endplate 17 to rotate from side to side while still remaining vertical. The endplate mounting structure also enables the endplates to be raised if an object in the water is detected by sonar or equivalent so as to avoid damage. The endplates 17 can also be raised to reduce the draft of the WIG in port.

Horizontally configured bearings 36 are on the end of the struts 37, 38 and the corners of the plate 44 and the box section 45. Vertical bearings 35, 43 allow the endplate 17 to rotate and align itself with the water flow. The endplate 17 is raised by extending the hydraulic rams 39, 48, at the same time the hydraulic ram 40 is extended to keep the endplate 17 vertical. The solid strut 41 maintains a constant distance between two of the bearings 36A and 36B. The solid strut 42 is in the same vertical alignment as strut 41 but extends aft from the lower bearing 36A to bearing 36C (FIG. 7(*c*)). It thereby keeps the endplates from moving forwards or backwards.

The vertical alignment of the endplate 17 is achieved by the structure shown in FIG. 19(*b*). This structure joins the endplate bulkhead at the wingtip portion with the wing 3 at the fore and aft position shown in 7(*c*). The plate 44 slides in and out between the roller bearings 46, which are between the plate 44 and the box section 45. Pressure differential on the endplate 17 forces the endplate to rotate on the bearing 36D outwards at the tip 19 and inwards at the top of the bulkhead 34 until the top part of the endplate bulkhead 34 comes in contact with a stop 49 on the top of the plate 44.

The flexible seal 50 prevents air escaping between the upper edge of the endplate bulkhead 34 and the wing 3. The seal is on the top of the endplate bulkhead 34 rather than the bottom so that the air pressure acting outwards on the endplate bulkhead 34 partially counteracts the turning moment of the air pressure acting on the endplate 17. This reduces the twisting moment on the endplate mounting structure.

When the endplates 17 are in the water 26 they can be used for maintaining the direction of travel and steering the WIG. The hydraulic ram 47 moves the endplate 17 from side to side to alter the fore and aft alignment of the WIG. This same mechanism is used to control the endplate 17 alignment at slow subcavitating speeds as well as during free flight and PAR operations. The wing lift during these PAR operations is increased over the prior art because the elimination of the air gap 8 prevents pressurised air from escaping sideways.

The endplates 17 may also be attached to the wingtip portion by way of fastening means, such as explosive bolts, designed to detach at a predetermined load, such as will occur when the endplate impacts a large object in the water. The endplates 17 will then separate from the WIG without causing any damage to the WIG.

Alternatively, the endplates 17 may be configured such that a lower portion of the endplate detaches from the upper portion on impact, thus leaving the upper portion of the endplate to work, albeit inefficiently.

The endplate bulkhead at the wing tip portion is thicker than the endplate 17 and is contoured sideways and vertically for minimum air drag. The additional thickness provides additional strength for spreading the loads from the attachment points 35, 43, to the rest of the endplate 17.

Figure 20A:
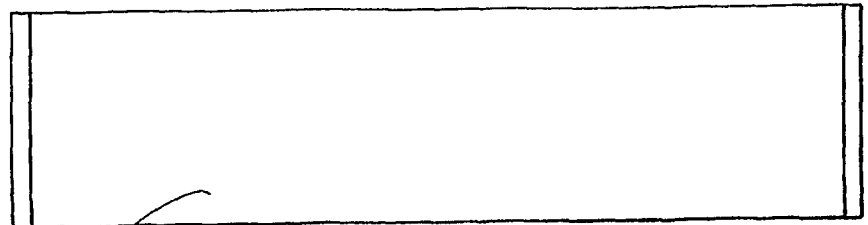
FIG. 20(a) is a plan view of a flying wing according to a preferred embodiment of the present invention.
Figure 20B:
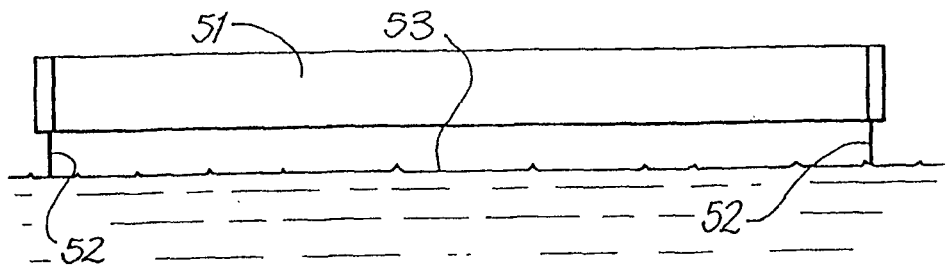
FIG. 20(b) is a front elevation view of the flying wing of FIG. 20(a).
Figure 20C:
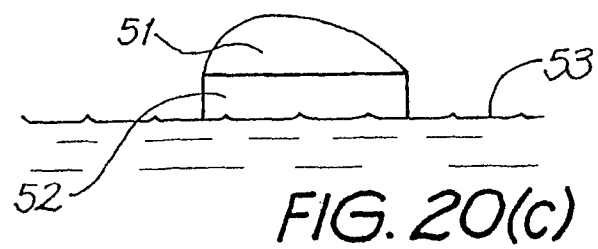
FIG. 20(c) is a side elevation view of the flying wing of FIG. 20(a).

In another embodiment of the present invention, the WIG is configured such that the fuselage and wing structure form a flying wing structure without a separate distinct fuselage. This embodiment, shown in FIGS. 20(*a*) to 20(*c*) would theoretically be more efficient for larger WIG's than the seaplane configuration shown in FIGS. 6(*a*) to 6(*c*). The endplates 52 have the same features as the endplates 17 used in the sea plane configuration and they eliminate the gap between the wing 51 and the water 53 in the same way.

Figure 21A:
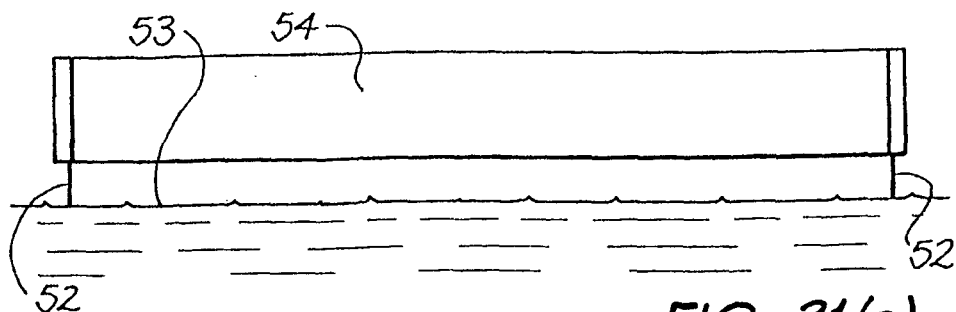
FIG. 21(a) is a front elevation view of an alternate flying wing.
Figure 21B:
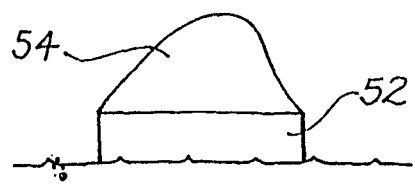
FIG. 21(b) is a side elevation view of the flying wing of FIG. 21(a).

A flying-wing configuration eliminates the fuselage and tail thereby reducing the weight and skin friction. The disadvantage of a flying-wing is that it has a reduced internal volume. This disadvantage can be overcome by increasing the thickness of the wing in the alternate embodiment of FIGS. 21(a) and 21(b). The thicker wing 54 would require boundary layer control to reduce separation and its associated drag to an acceptable level.

The combination of a thick wing 54 and surface piercing endplates allows a high wing lift coefficient to be used without unduly increasing the induced drag. This configuration has a very high lift/drag ratio.

Whilst the embodiments of the present invention described above all allowed for lateral displacement of the trailing edge of the endplate to provide a weathercock stabilising effect, the applicant also envisages forms of endplate which will not require the provision of a pivotal mounting of the endplate or equivalent to provide the weathercock effect.

As described above, the WIG is typically flown with the endplates constantly in the water. This is contrary to the prior art and has the advantage of creating a very large reduction in the yaw angle of the endplates. For instance, a WIG flying completely above the water surface at 150 knots (77 m/s) with a 40 knot (21 m/s) sidewind would have a sideslip angle of approximately 15°. If however the endplates are constantly in the water there is no sideslip angle created by the wind and the only yaw angle is that created by the sideways orbital velocity of wave action. This water velocity at the surface is likely to be less than 5 knots (2.6 m/s) for a sea state 4 creating an endplate yaw angle of only approximately 2°. This angle will reduce further with increasing speed of the WIG.

If an endplate nose shape is now chosen so that the cavity length at cruise speed is increased to several, say 5, times the endplate chord length, there will also be a linear increase in the cavity width. This increased cavity width, because of the reduced yaw angle, may now be sufficient to accommodate the small yaw angles without the aft portion of the endplate wetting and creating additional side force and drag. With the cavity not moving laterally sufficiently to impact the endplate, the need to align the endplate aft portion with the incoming waterflow is reduced.

As the cavity drag is proportional to its length, this endplate would have a higher cavity drag than a pivotable endplate with a cavity length only slightly longer than the endplate chord length. It would however have the advantage of decreased complexity which is desirable.

To avoid the need to pivot the endplate, a nose should be designed which is sufficiently narrow to provide low drag characteristics whilst still generating a supercavity with a length several times the endplate chord length at design cruise speeds so as to allow for small yaw angles. The nose should also generate a sufficiently long cavity at low speeds such that adverse twisting moments about the endplate centre of gravity do not tend to excessively flex the endplate forward end portion of the endplate and cause divergence.

Whilst a suitable nose shape is a flat nose as discussed above in relation to the above described embodiments of the present invention, other shapes will also be suitable and capable of generating the necessary supercavity. A particular advantage of the flat nose is that it creates a stabilising twisting moment about the pivot axis of a pivoting endplate, and accordingly a stable twisting moment would also be created about the centre of gravity of a fixed endplate. The cavity generated by the flat nose 28 is created at the edge 31 of the flat nose, such that the entire forward end portion 30 of the endplate is unwetted.

Alternate nose designs, however, that have part of the forward end portion toward the leading edge wetted upstream of the waterflow detachment point initiating the cavity, will also be acceptable, so long as the leading edge wetted length is sufficiently low to keep the resulting side forces, tending to laterally flex the endplate forward portion in a divergent manner, to a manageable level at high cruise speeds.

Figure 22:
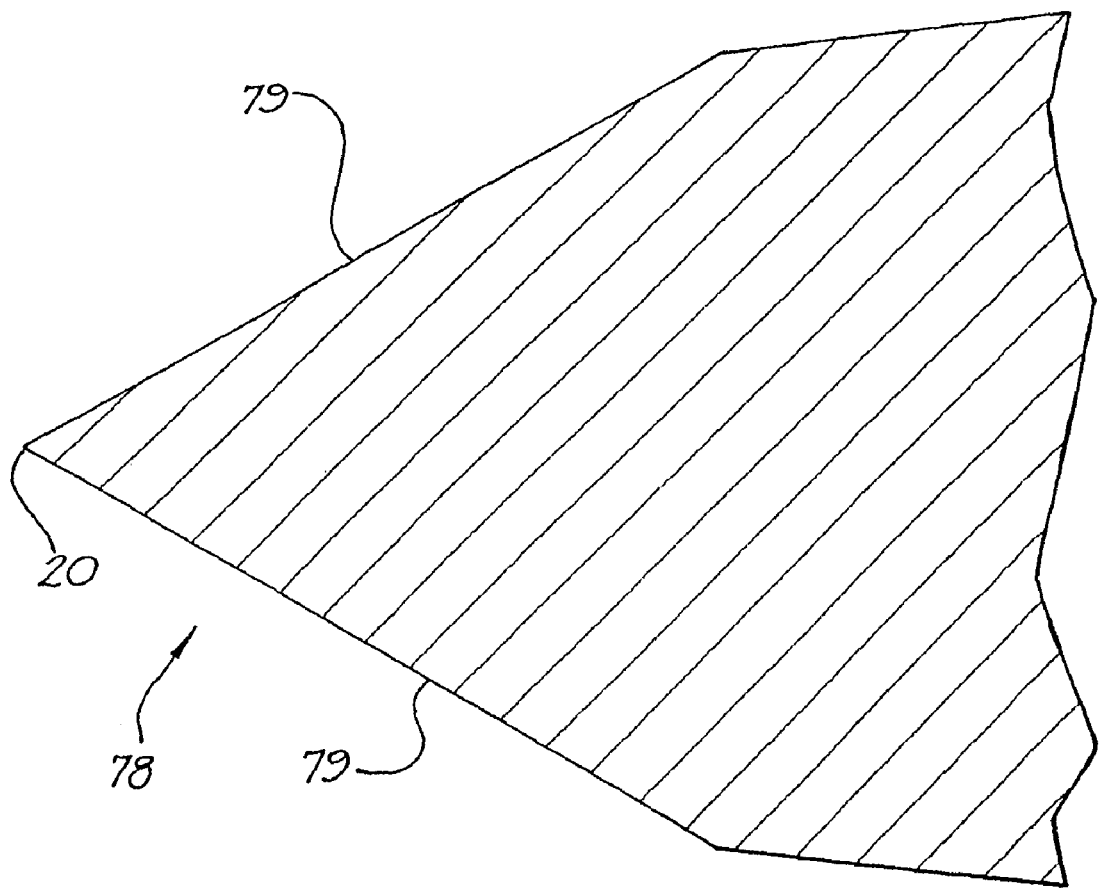
FIG. 22 is an enlarged fragmentary cross sectional plan view of a nose of an alternate endplate.

A suitable nose shape is a triangular prism resembling a simple broad wedge with a width of 0.006 times the chord length and a maximum depth in the chordwise direction of less than 0.83 times the nose width. This provides a maximum nose depth of 0.005 times the chord length for a maximum width endplate. Such a nose configuration is depicted in FIG. 22, where the nose 78 has two inclined faces 79. These maximum dimensions need only apply as an average over the lowermost 4 feet (1200 mm) of the endplate, allowing operation at a design immersion depth of 4 feet (1200 mm). For larger design immersion depths, these nose size restrictions should apply over a greater span of the endplate. The nose should also be sufficiently wide to produce a supercavity at design cruise speeds. The wedge dimensions, and particularly the restriction on the relative depth, will ensure a sufficiently blunt nose shape to keep any wetted length at the leading edge sufficiently low.

Other more streamlined shapes can be used provided the width and depth limitations set out above are met. Curved nose faces are not preferred, however, because of the dangers of face cavitation at the high cruise speed of WIGs. This cavitation may cause the problem of variable drag, resulting in a variable and unpredictable cavity size. To asses the stability of an endplate with a nose as described above, we can calculate the minimum velocity required to produce a cavity extending to at least the mid chord point of the endplate which will be the approximate location of the centre of gravity of the endplate. This will result in there being no large wetted area forward of the centre of gravity which could tend to adversely flex the endplate to cause divergence.

This velocity can be calculated by combining equations 1(a) and 1(b) to arrive at:

$$V = \sqrt{\frac{lgH}{10hC_D}}$$

where:

$C_D=0.51$=drag coefficient of a wedge with the above maximum dimensions (thickness/chord=1.2)

H=13.32' (4060 mm)=Maximum wave height for sea state 4, l=60'/2=30' (9140 mm)

The above provides a velocity V of 83 fps=49 knots (25 m/s).

The described nose shape will therefore unwet the front half of the endplate at the slow speed of 49 knots (25 m/s). This speed is low enough to avoid low speed divergence caused by the side force acting on a large wetted area in front of the centre of gravity of the endplate (located at 50% of chord).

This nose shape 78 has a low wetted length (measured in the chordwise direction) of 0.005 times the chord length (as only the faces 79 of the wedge shaped nose will be wetted) and as such the endplate will not diverge at high cruise speeds.

In addition this nose shape has a narrow width of 0.006 times the chord length so that the overall cavity drag coefficient is only 0.006×0.51 (width×drag coefficient of this shaped wedge)=0.003 which is an order of magnitude less than that quoted by the prior art.

A fixed non-pivoting endplate with this nose can therefore be a very satisfactory endplate. This nose shape can also be used on pivoting endplates such as those described above.

As described above in relation to the embodiment of FIGS. 18(a) and 18(b), a 2 stage nose can be used to expand the cavity and avoid divergence in yaw with a pivoting endplate. It is also possible to use a protrusion 64, forming a 2 stage nose, on a fixed endplate provided the angles of yaw are small, as will be the case with the endplates constantly in the water as discussed above. It is therefore possible to construct a low drag fixed endplate that will not diverge or fail in yaw by using a protrusion 64 forming a 2 stage nose and running the endplates constantly in the water.

The front nose 28 can be of any suitable shape to produce a supercavity at design cruise speeds with the endplates immersed to a design immersion depth, however for the same reasons as set out above, the preferred shape is flat. A flat nose does not incur any side force and this is particularly important when the endplate is fixed and very narrow to reduce the cavity drag. The front nose 28 should be sized to provide a supercavity just longer than the endplate chord length and the endplate therefore has the same low drag as the rotating endplate when the endplate is not yawed.

In yaw, the protrusion 64 forming the 2nd stage nose will incur additional drag caused by the pressure of the water on the 2nd stage nose 64. The average drag on the 2nd stage nose 24 will however be small and this type of endplate is therefore an attractive option when it is wished to avoid the complexity of pivoting endplates.

What is claimed is:

1. A wing in ground effect vehicle having a fuselage, a wing structure with opposing wing tip portions and a pair of supercavitating endplates, each of said supercavitating endplates extending downwardly from a respective one of said wing tip portions below said fuselage and said wing structure for immersion in water during overwater flight of the vehicle, each said endplate comprising:
   a proximal root;
   a distal tip;
   a forward portion including a nose defining a leading edge of said endplate and terminating in a nose lateral edge on each lateral side of said endplate, said nose being adapted to generate a cavity extending rearwardly from each said nose lateral edge between a respective one of said lateral sides of said endplate and water passing over said endplate, in use, at a zero yaw condition at speeds up to and including a design cruise speed with said endplate immersed in water to a design immersion depth, said cavities forming a supercavity at said design cruise speed;
   an aft portion terminating in a trailing edge; and
   means supporting at least part of said forward portion of each said endplate laterally fixed with respect to a respective one of said wing tip portions and supporting said trailing edge of each said endplate laterally displaceable, with respect to a respective one of said wing tip portions, in response to water flowing over said endplate in use.

2. A wing in ground effect vehicle having a fuselage, a wing structure with opposing wing tip portions and a pair of supercavitating endplates, each of said supercavitating endplates extending downwardly from a respective one of said wing tip portions to below said fuselage and said wing structure for immersion in water during overwater flight of the vehicle, each said endplate comprising:
   a proximal root;
   a distal tip;
   a forward portion including a nose defining a leading edge of said endplate and terminating in a nose lateral edge on each lateral side of said endplate, said nose being adapted to generate a cavity extending rearwardly from each said nose lateral edge between a respective one of said lateral sides of said endplate and water passing over said endplate, in use, at a zero yaw condition at speeds up to and including a design cruise speed with said endplate immersed in water to a design immersion depth, said cavities forming a supercavity at said design cruise speed; and
   an aft portion terminating in a trailing edge, said nose of each said endplate being substantially flat and lying in a plane that is substantially perpendicular to a chordwise direction of each said end plate.

3. The wing in ground effect vehicle according to claims 1 or 2 wherein each said endplate is pivotably mounted about a pivot axis, each said pivot axis extending in a span-wise direction of each said endplate, said forward portion of each said end plate being laterally fixed at said pivot axis.

4. The wing in ground effect vehicle of claim 3 further comprising means for actively controlling rotation of each said endplates about a respective one of said pivot axes.

5. The wing in ground effect vehicle according to claims 1 or 2 wherein said forward portion of each said endplate is fixed, and said aft portion of each said endplate is pivotally mounted about a pivot axis, each said pivot axis extending in a span-wise direction of said endplate.

6. The wing in ground effect vehicle of claim 3 wherein said pivot axis of each said endplate is located forward of a hydrodynamic center of pressure of said endplate at said design cruise speed with said endplate immersed in water to said design immersion depth.

7. The wing in ground effect vehicle of claim 5, wherein said pivot axis of each said endplate is located forward of a hydrodynamic center of pressure of said endplate at said design cruise speed with said endplate immersed in water to said design immersion depth.

8. The wing in ground effect vehicle of claim 3, wherein said pivot axis of each said endplate is located less than 0.25 times the chord length of said endplate aft of said leading edge at a span-wise position midway between said endplate root and tip.

9. The wing in ground effect vehicle of claim 5, wherein said pivot axis of each said endplate is located less than 0.25 times the chord length of said endplate aft of said leading edge at a span-wise position midway between said endplate root and tip.

10. The wing in ground effect vehicle according to claims 1 or 42 wherein said forward portion of each said endplate is fixed, and said aft portion of each said endplate is laterally flexible and is mounted to said forward portion.

11. The wing in ground effect vehicle of claim 10, wherein said aft portion of each said endplate extends forward of a hydrodynamic center of pressure of said endplate at said design cruise speed with said endplate immersed in water to said design immersion depth.

12. The wing in ground effect vehicle of claim 10, wherein said aft portion of each said endplate has a chord length of at least 0.75 times the chord length of said end plate at a span-wise position midway between said end plate root and tip.

13. A wing in ground effect vehicle having a fuselage, a wing structure with opposing wing tip portions and a pair of supercavitating endplates, each of said supercavitating endplates extending downwardly from a respective one of said wing tip portions below said fuselage and said wing structure for immersion in water during overwater flight of the vehicle, each said endplate comprising:
- a proximal root;
- a distal tip;
- a forward portion including a nose defining a leading edge and adapted to generate a supercavity between each lateral side of said endplate and water passing over said endplate, in use, at a zero yaw condition at a design cruise speed with said endplate immersed in water to a design immersion depth;
- an aft portion terminating in a trailing edge; and
- a protrusion on each opposing side of said front portion, at a lower region thereof and aft of said nose, for engaging water passing outside of said supercavity, on the upstream side of said endplate when said endplate is yawed with respect to the water passing over said endplate and/or on both sides of said endplate when said endplate is immersed beyond said design immersion depth, each said protrusion extending in a span-wise direction and having a face configured to create a stabilizing moment upon engaging the water, said lower region having a length in said span-wise direction at least equal to said design immersion depth of said endplate.

14. A wing in ground effect vehicle having a wing structure with opposing wing tip portions and a pair of supercavitating endplates each extending downwardly from a respective one of said wing tip portions below said wing structure for immersion in water during overwater flight of the vehicle, each said endplate comprising:
- a proximal root;
- a distal tip;
- a forward portion including a nose defining a leading edge and adapted to generate a supercavity between each lateral side of said endplate and water passing over said endplate, in use, at a zero yaw condition at a design cruise speed with said endplate immersed in water to a design immersion depth; and
- an aft portion terminating in a trailing edge, said nose having an average width, over a lowermost 1200 mm of said nose, not greater than 0.006 times a chord length of said endplate from said nose to said tip, and an average depth, measured in a chordwise direction, of not greater than 0.83 times said nose average width.

15. The wing in ground effect vehicle of claim 14 wherein said nose of each said endplate is in the general form of a triangular prism extending in a spanwise direction.

16. The wing in ground effect vehicle as in any one of claims 1, 2, 13 and 14, wherein said forward portion of each said endplate tapers towards said nose.

17. The wing in ground effect vehicle as in any one of claims 1, 13 and 14, wherein said nose of each said endplate is substantially flat and lies in a plane substantially perpendicular to the chord-wise direction of said endplate.

18. The wing in ground effect vehicle of claim 2, wherein the width of said nose of each said endplate satisfies the following equation:

$$\frac{gHL}{8.8V^2} \le h \le 10\left(\frac{gHL}{8.8V^2}\right)$$

wherein h=nose width, g=acceleration due to gravity, H=design immersion depth of said endplate, L=chord length of endplate, V=vehicle design speed.

19. The wing in ground effect vehicle of claim 17, wherein the width of said nose of each said endplate satisfies the following equation:

$$\frac{gHL}{8.8V^2} \le h \le 10\left(\frac{gHL}{8.8V^2}\right)$$

wherein h=nose width, g=acceleration due to gravity, H=design immersion depth of said endplate, L=chord length of endplate, V=vehicle design speed.

20. The wing in ground effect vehicle as in any one of claims 1, 2, 13 and 14, wherein each said supercavity has a length less than 5 times said chord length at substantially all span-wise locations within 50% of said design immersion depth from said endplate tip.

21. The wing in ground effect vehicle as in any one of claims 1, 2 and 13 wherein over the lowermost 1200 mm of said nose, said nose has an average width not greater than 0.006 times said chord length and an average depth, measured in a chordwise direction, of not greater than 0.83 times said nose average width.

22. The wing in ground effect vehicle according to claims 1 or 2 wherein each said endplate is provided with at least one protrusion on each opposing side of said front portion of said endplate and at a lower region thereof, and aft of said nose, said at least one protrusion engaging water passing outside of said supercavity on the upstream side of said endplate when said endplate is yawed with respect to said water passing over said endplate and/or on both sides of said endplate when said endplate is immersed beyond said design immersion depth, each of said protrusions extending in a span-wise direction and having a face configured to create a stabilizing moment upon engaging said water, said lower region having a length in said span-wise direction at least equal to said design immersion depth of said endplate.

23. The wing in ground effect vehicle of claim 13 wherein each said protrusion is in the form of a flap configurable between a retraced position within said endplate and an extended position protruding beyond said endplate for engaging water passing outside of said cavity.

24. The wing in ground effect vehicle of claim 22 wherein each said protrusion is in the form of a flap configurable between a retracted position within said endplate and an extended position protruding beyond said endplate for engaging water passing outside of said cavity.

25. The wing in ground effect vehicle of claim 13 wherein each said protrusion is fixed.

26. The wing in ground effect vehicle of claim 22 wherein each said protrusion is fixed.

27. The wing in ground effect vehicle of claim 13, wherein each of said protrusions has a concave front surface facing said leading edge.

28. The wing in ground effect vehicle of claim 22, wherein each of said protrusions has a concave front surface facing said leading edge.

29. The wing in ground effect vehicle as in any one of claims 1, 2, 13 and 14, wherein each said endplate is provided with a retractable leading edge device of greater width than said nose, said leading edge device being extendable along and over said leading edge.

30. The wing in ground effect vehicle of claims 29 wherein said leading edge device of each said endplate has a substantially flat front surface lying in a plane substantially perpendicular to said chord-wise direction of said end plate.

31. The wing in ground effect vehicle as in any one of claims 1, 2, 13 and 14, wherein each said endplate is curved inwards towards the center of said vehicle at said leading and trailing edges and at said tip.

32. The wing in ground effect as in any one of claims 1, 2, 13 and 14, wherein each said endplate is tapered in thickness from said root to said tip.

33. The wing in ground effect vehicle as in any one of claims 1, 2, 13 and 14, wherein said trailing edge of each said end plate is tapered.

34. The wing in ground effect vehicle as in any one of claims 1, 2, 13 and 14, wherein each said endplate is provided with a plurality of wedge-shaped members secured to a lower region of said aft portion thereof, said lower region having a length in said span-wise direction at least equal to a design immersion depth of said endplate.

35. The wing in ground effect vehicle as in any one of claims 1, 2, 13 and 14, wherein said distal tip of each said endplate is lower at said trailing edge than at said leading edge when viewed in a chord-wise direction.

36. The wing in ground effect vehicle as in any one of claims 1, 2, 13 and 14, wherein each said endplate forward portion is provided with a pair of support struts on opposing sides of said endplate, each of said support struts having a first end secured to said wing and a second end secured to said endplate toward said tip.

37. The wing in ground effect vehicle of claim 36 wherein each said support strut first end is displaceable with respect to said wing towards said endplate root.

38. The wing in ground effect vehicle of claim 13, wherein said forward portion of each said endplate is provided with apertures, forward of said protrusions, said apertures extending through the thickness of said endplate.

39. The wing in ground effect vehicle of claim 23, wherein said forward portion of each said endplate is provided with apertures, forward of said protrusions, said apertures extending through the thickness of said endplate.

40. The wing in ground effect vehicle of claim 24, wherein said forward portion of each said endplate is provided with apertures, forward of said protrusions, said apertures extending through the thickness of said endplate.

41. The wing in ground effect vehicle as in any one of claims 1, 2, 13 and 14, wherein said leading edge of each said endplate is raked aft.

42. The wing in ground effect vehicle as in any one of claims 1, 2, 13 and 14, wherein said leading edge of each said endplate is located forward of a leading edge of said wing at said endplate proximal root.

43. The wing in ground effect vehicle as in any one of claims 1, 2, 13 and 14, wherein each said endplate is retractably mounted with respect to said wing tip portion to thereby enable raising of said endplate.

44. The wing in ground effect vehicle as in any one of claims 1, 2, 13 and 14, wherein each said endplate is mounted on said wing tip portion by fastening means adapted to detach at a predetermined load.

45. The wing in ground effect vehicle as in any one of claims 1, 2, 13 and 14, wherein each said endplate is mounted on said wing tip portion by explosive bolts.

46. The wing in ground effect vehicle as in any one of claims 1, 2, 13 and 14 wherein a lower portion of each said endplate is configured to detach from an upper portion of said endplate upon impact of a predetermined load on said lower portion.

47. The wing in ground effect vehicle as in any one of claims 1, 2, 13 and 14, wherein said fuselage and said wing structure form a flying wing structure.

48. The wing in ground effect vehicle as in any one of claims 1, 2, 13 and 14, wherein said proximal root of each said endplate is located outboard of and adjacent to said respective wingtip portion with a gap therebetween, and further including a seal spanning a gap between said endplate proximal root and said wingtip portion towards an upper surface of said wingtip portion.

* * * * *

UNITED STATES PATENT AND TRADEMARK OFFICE
CERTIFICATE OF CORRECTION

PATENT NO. : 7,059,259 B2  
APPLICATION NO. : 10/275943  
DATED : June 13, 2006  
INVENTOR(S) : Ken R. Allen It is certified that error appears in the above-identified patent and that said Letters Patent is hereby corrected as shown below:

Col. 24, line 24
  replete "end-plate"
  with --endplate,--.

Col. 24, line 33
  replace "endplates"
  with --endplate--.

Col. 24, line 60
  replace "42"
  with --2--.

Col. 25, line 3
  replace "end"
  with --end- --.

Col. 25, line 4
  replace "end plate"
  with --endplate--.

Col. 27, line 4
  replace "claims"
  with --claim--.

Col. 27, line 7
  replace "end plate"
  with --endplate--.

UNITED STATES PATENT AND TRADEMARK OFFICE
CERTIFICATE OF CORRECTION

PATENT NO. : 7,059,259 B2
APPLICATION NO. : 10/275943
DATED : June 13, 2006
INVENTOR(S) : Ken R. Allen It is certified that error appears in the above-identified patent and that said Letters Patent is hereby corrected as shown below:

Col. 27, line 17
  replace "end plate"
  with --endplate--.

Signed and Sealed this

Twenty-ninth Day of May, 2007

JON W. DUDAS
*Director of the United States Patent and Trademark Office*